US012724397B2

(12) United States Patent
Koike

(10) Patent No.: US 12,724,397 B2
(45) Date of Patent: Sep. 1, 2026

(54) CUTTING SYSTEM, DISPLAY SYSTEM, PROCESSING APPARATUS, PROCESSING METHOD, AND PROCESSING PROGRAM

(71) Applicant: Sumitomo Electric Industries, Ltd., Osaka (JP)

(72) Inventor: Yusuke Koike, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 214 days.

(21) Appl. No.: 17/916,055

(22) PCT Filed: Apr. 13, 2020

(86) PCT No.: PCT/JP2020/016248
§ 371 (c)(1),
(2) Date: Sep. 30, 2022

(87) PCT Pub. No.: WO2021/210037
PCT Pub. Date: Oct. 21, 2021

(65) Prior Publication Data

US 2023/0166376 A1 Jun. 1, 2023

(51) Int. Cl.
*G05B 19/4065* (2006.01)
*B23C 5/10* (2006.01)
(Continued)

(52) U.S. Cl.
CPC .......... *G05B 19/4065* (2013.01); *B23C 5/109* (2013.01); *B23C 9/00* (2013.01);
(Continued)

(58) Field of Classification Search
CPC ....... G15B 19/4065; B23C 5/109; B23C 9/00; B23C 2260/76; B23Q 17/0966;
(Continued)

(56) References Cited

U.S. PATENT DOCUMENTS 7,104,866 B2 * 9/2006 Yamane .................. B24B 49/16
408/8
8,113,066 B2 * 2/2012 Eckstein ............ B23Q 17/0966
73/862.045

(Continued)

FOREIGN PATENT DOCUMENTS

CN 109940459 A 6/2019
EP 3486737 A1 5/2019

(Continued)

OTHER PUBLICATIONS

International Search Report and Written Opinion mailed on Jul. 7, 2020, received for PCT Application PCT/JP2020/016248, filed on Apr. 13, 2020, 8 pages including English Translation.

(Continued)

*Primary Examiner* — Jonathan M Dunlap
(74) *Attorney, Agent, or Firm* — XSENSUS LLP

(57) ABSTRACT

A cutting system includes a cutting tool for milling, a plurality of sensors, and a processor, wherein the cutting tool performs a cutting process using two or more cutting blades, the plurality of sensors measure a physical quantity indicating a state regarding a load of the cutting tool at a time of the cutting process, and the processor generates, based on measurement results of the sensors at a plurality of measurement timings, two-dimensional data for each measurement timing, the two-dimensional data regarding the load in two directions on a plane perpendicular to a rotation axis of the cutting tool, classifies pieces of the generated two-dimensional data into any of a plurality of unit regions, a number of which is equal to or greater than a number of the cutting blades on the plane, and detects, based on the two-dimensional data for each unit region, an abnormality of the cutting blade.

13 Claims, 15 Drawing Sheets

(51) Int. Cl.
*B23C 9/00* (2006.01)
*B23Q 17/09* (2006.01)

(52) U.S. Cl.
CPC ...... *B23Q 17/0966* (2013.01); *B23C 2260/76* (2013.01); *G05B 2219/37087* (2013.01); *G05B 2219/37274* (2013.01); *G05B 2219/37355* (2013.01); *G05B 2219/41376* (2013.01); *G05B 2219/50203* (2013.01); *G05B 2219/50327* (2013.01)

(58) Field of Classification Search
CPC ........... G05B 2219/37087; G05B 2219/37274; G05B 2219/37355; G05B 2219/41376; G05B 2219/50203; G05B 2219/50327
See application file for complete search history.

(56) References Cited

U.S. PATENT DOCUMENTS

| | | | | |
|---|---|---|---|---|
| 8,589,103 | B2 | 11/2013 | Matsubara et al. | |
| 9,839,982 | B2 * | 12/2017 | Ando | B23Q 17/0961 |
| 9,864,362 | B2 * | 1/2018 | Wunderlich | G05B 19/4065 |
| 10,010,991 | B2 * | 7/2018 | Takahashi | G01K 13/08 |
| 10,265,818 | B2 * | 4/2019 | Tanaka | B23Q 15/14 |
| 10,850,360 | B2 * | 12/2020 | Tanaka | B23Q 17/0961 |
| 10,990,085 | B2 * | 4/2021 | Otsu | G05B 19/4183 |
| 11,433,498 | B2 * | 9/2022 | Laurent | G05B 19/4065 |
| 11,630,005 | B1 | 4/2023 | Yudkevich et al. | |
| 11,794,299 | B2 | 10/2023 | Maxted et al. | |
| 2006/0019578 | A1 | 1/2006 | Yamane et al. | |
| 2009/0235763 | A1 * | 9/2009 | Eckstein | G01L 5/0076 73/862.321 |
| 2015/0261207 | A1 | 9/2015 | Wunderlich et al. | |
| 2016/0303698 | A1 | 10/2016 | Takahashi et al. | |
| 2017/0001279 | A1 | 1/2017 | Ando | |
| 2018/0029185 | A1 | 2/2018 | Tanaka | |
| 2018/0071876 | A1 | 3/2018 | Tanaka | |
| 2018/0117725 | A1 | 5/2018 | Laurent et al. | |
| 2020/0026262 | A1 | 1/2020 | Otsu et al. | |
| 2023/0161320 | A1 | 5/2023 | Koike et al. | |
| 2023/0166376 | A1 | 6/2023 | Koike | |

FOREIGN PATENT DOCUMENTS

| | | | |
|---|---|---|---|
| JP | 63-62645 | A | 3/1988 |
| JP | 3-1744 | U | 1/1991 |
| JP | H05-96445 | A | 4/1993 |
| JP | 6-8106 | A | 1/1994 |
| JP | 11-118625 | A | 4/1999 |
| JP | 2006-26855 | A | 2/2006 |
| JP | 2006-71485 | A | 3/2006 |
| JP | 2006-142460 | A | 6/2006 |
| JP | 2013-132734 | A | 7/2013 |
| JP | 2015-77658 | A | 4/2015 |
| JP | 2016-40071 | A | 3/2016 |
| JP | 2018-24086 | A | 2/2018 |
| JP | 2018-43317 | A | 3/2018 |
| JP | 2020-11330 | A | 1/2020 |
| WO | 2019/101617 | A1 | 5/2019 |
| WO | 2021/210037 | A1 | 10/2021 |

OTHER PUBLICATIONS

Kaneko et al., “Cutting force model for end milling based on the inclined cutting theory”, Journal of Japan Society of Mechanical Engineers, vol. 83, No. 856, 2017, 21 pages including English Translation.

Related Application, PCT/JP2020/041484, filed on Nov. 6, 2020 and filed as a U.S. National Phase, 84 pages.

Office Action “Notice of Reasons for Refusal” issued on Oct. 10, 2023, in corresponding Japanese patent Application No. 2021-178717, 6 pages.

Pro-Micron Gmbh: “Intelligent tool-holder—wear detection of every cutting edge with spike®”, Sep. 24, 2019, URL:https://www.youtube.com/watch?v=la8n55VVwKI, 2 pages, XP093037979.

Notice of Allowance issued on Jan. 9, 2024, in corresponding Japanese patent Application No. 2021-178717, 5 pages.

U.S. Notice of Allowance issued Sep. 4, 2024 in co-pending U.S. Appl. No. 17/916,029, 60 pages.

Notice of Allowance issued on Mar. 20, 2025 to the related U.S. Appl. No. 17/916,029.

Office Action dated Dec. 19, 2024 in related U.S. Appl. No. 17/916,029 (18 pages).

* cited by examiner

DS
G1
moving standard deviation ms [Nm]
time [seconds]
ms1
ms2
ms3
ms4
G4
moving standard deviation MS [Nm]
time [seconds]
MS1
MS2
MS3
MS4
ts
t1
t2
te
C
D(Mx,My)
Mx [Nm]
My [Nm]

CUTTING SYSTEM, DISPLAY SYSTEM, PROCESSING APPARATUS, PROCESSING METHOD, AND PROCESSING PROGRAM

CROSS-REFERENCE TO RELATED APPLICATIONS

The present application is based on PCT/JP2020/016248 filed on Apr. 13, 2020. This application is also related to U.S. Ser. Number: 17/916,029, entitled: PROCESSING SYSTEM, DISPLAY SYSTEM, PROCESSING APPARATUS, PROCESSING METHOD FOR PROCESSING APPARATUS, AND PROCESSING PROGRAM, filed on Sep. 30, 2022. The entire contents of each of which are incorporated herein by reference.

TECHNICAL FIELD

The present disclosure relates to a cutting system, a display system, a processing apparatus, a processing method, and a processing program.

BACKGROUND ART

Patent Literature 1 (Japanese Unexamined Patent Application Publication No. 2015-77658) discloses the following state measurement apparatus. That is, the state measuring apparatus is a state measuring apparatus that measures a state of a cutting tool during a cutting process, wherein the cutting tool is configured by a rotating body that has one or more cutting edges and machines a workpiece by bringing the cutting edges into contact with the workpiece while rotating, and includes a measurement unit that is attached to the cutting edge or a vicinity of the cutting edge and measures a state of the cutting edges, an AD converter attached to the cutting tool and configured to acquire a measurement value measured by the measurement unit at a predetermined sampling rate and perform AD conversion, a transmission unit configured to transmit the acquired measurement value using digital wireless communication each time the measurement value is acquired from the AD converter, and a monitor apparatus provided outside the cutting tool, and the monitoring apparatus includes a reception unit that receives the measurement value transmitted by the transmission unit, and a data management unit that causes a display unit to display the measurement value and causes a storage unit to store the measurement value each time the measurement value is received by the reception unit.

PRIOR ART DOCUMENT

Patent Literature

[Patent Literature 1] Japanese Unexamined Patent Application Publication No. 2015-77658.

[Patent Literature 2] Japanese Unexamined Patent Application Publication No. 2013-132734

[Patent Literature 3] Japanese Unexamined Patent Application Publication No. 2018-43317

[Patent Literature 4] Japanese Unexamined Patent Application Publication No. 2018-24086

[Patent Literature 5] Japanese Unexamined Patent Application Publication No. 2006-71485

[Patent Literature 6] Japanese Unexamined Patent Application Publication No. 11-118625

[Patent Literature 7] Japanese Unexamined Patent Application Publication No. 2016-40071

[Patent Literature 8] U.S. Unexamined Patent Application Publication No. 2015/0261207

[Patent Literature 9] European Unexamined Patent Application Publication No. 3486737

[Patent Literature 10] Japanese Unexamined Patent Application Publication No. 2018-24086

SUMMARY OF INVENTION (1) A cutting system according to the present disclosure includes a cutting tool for milling, a plurality of sensors, and a processing unit, wherein the cutting tool performs a cutting process using two or more cutting blades, the plurality of sensors measure a physical quantity indicating a state regarding a load of the cutting tool at a time of the cutting process, and the processing unit generates, based on measurement results obtained by each of the sensors at a plurality of measurement timings, two-dimensional data for each of the measurement timings, the two-dimensional data regarding the load in two directions on a plane perpendicular to a rotation axis of the cutting tool, classifies pieces of the generated two-dimensional data into any of a plurality of unit regions, a number of which is greater than or equal to a number of the cutting blades on the plane, and detects, based on the two-dimensional data for each of the unit regions, an abnormality of the cutting blades.

(8) A processing apparatus according to the present disclosure includes an acquisition unit configured to acquire measurement results of a physical quantity indicating a state regarding a load of a cutting tool for milling, the cutting tool being configured to perform a cutting process using two or more cutting blades, at a time of the cutting process, the measurement results being obtained by a plurality of sensors, a generation unit configured to generate, based on the measurement results obtained by each of the sensors at a plurality of measurement timings, the measurement results being acquired by the acquisition unit, two-dimensional data for each of the measurement timings, the two-dimensional data regarding the load in two directions on a plane perpendicular to a rotation axis of the cutting tool, and a detection unit configured to classify pieces of the two-dimensional data generated by the generation unit into any of a plurality of unit regions, a number of which is greater than or equal to a number of the cutting blades on the plane, and detect, based on the two-dimensional data for each of the unit regions, an abnormality of the cutting blades.

(9) A processing method according to the present disclosure is a processing method in a processing apparatus, the processing method includes acquiring measurement results of a physical quantity indicating a state regarding a load of a cutting tool for milling, the cutting tool being configured to perform a cutting process using two or more cutting blades, at a time of the cutting process, the measurement results being obtained by a plurality of sensors, generating, based on the acquired measurement results obtained by each of the sensors at a plurality of measurement timings, two-dimensional data for each of the measurement timings, the two-dimensional data regarding the load in two directions on a plane perpendicular to a rotation axis of the cutting tool, and classifying pieces of the generated two-dimensional data into any of a plurality of unit regions, a number of which is greater than or equal to a number of the cutting blades on the plane, and detecting, based on the two-dimensional data for each of the unit regions, an abnormality of the cutting blades.

(10) A processing program according to the present disclosure is a processing program to be used in a processing apparatus, the processing program being for causing a computer to function as, an acquisition unit configured to acquire measurement results of a physical quantity indicating a state regarding a load of a cutting tool for milling, the cutting tool being configured to perform a cutting process using two or more cutting blades, at a time of the cutting process, the measurement results being obtained by a plurality of sensors, a generation unit configured to generate, based on the measurement results obtained by each of the sensors at a plurality of measurement timings, the measurement results being acquired by the acquisition unit, two-dimensional data for each of the measurement timings, the two-dimensional data regarding the load in two directions on a plane perpendicular to a rotation axis of the cutting tool, and a detection unit configured to classify pieces of the two-dimensional data generated by the generation unit into any of a plurality of unit regions, a number of which is greater than or equal to a number of the cutting blades on the plane, and detect, based on the two-dimensional data for each of the unit regions, an abnormality of the cutting blades.

(11) A display system according to the present disclosure includes a cutting tool for milling, a plurality of sensors, and a processing apparatus, wherein the cutting tool performs a cutting process using two or more cutting blades, the plurality of sensors measure a physical quantity indicating a state regarding a load of the cutting tool at a time of the cutting process, and the processing apparatus performs a process of generating, based on measurement results obtained by each of the sensors at a plurality of measurement timings, two-dimensional data for each of the measurement timings, the two-dimensional data regarding the load in two directions on a plane perpendicular to a rotation axis of the cutting tool, classifying pieces of the generated two-dimensional data into any of a plurality of unit regions, a number of which is greater than or equal to a number of the cutting blades on the plane, and displaying a classification result.

(14) A processing apparatus according to the present disclosure includes an acquisition unit configured to acquire measurement results of a physical quantity indicating a state regarding a load of a cutting tool for milling, the cutting tool being configured to perform a cutting process using two or more cutting blades, at a time of the cutting process, the measurement results being obtained by a plurality of sensors, a generation unit configured to generate, based on the measurement results obtained by each of the sensors at a plurality of measurement timings, the measurement results being acquired by the acquisition unit, two-dimensional data for each of the measurement timings, the two-dimensional data regarding the load in two directions on a plane perpendicular to a rotation axis of the cutting tool, and a display processing unit configured to perform a process of classifying pieces of the two-dimensional data generated by the generation unit into any of a plurality of unit regions, a number of which is greater than or equal to a number of the cutting blades on the plane, and displaying a classification result.

(15) A processing method according to the present disclosure is a processing method in a processing apparatus, the processing method includes acquiring measurement results of a physical quantity indicating a state regarding a load of a cutting tool for milling, the cutting tool being configured to perform a cutting process using two or more cutting blades, at a time of the cutting process, the measurement results being obtained by a plurality of sensors, generating, based on the acquired measurement results obtained by each of the sensors at a plurality of measurement timings, two-dimensional data for each of the measurement timings, the two-dimensional data regarding the load in two directions on a plane perpendicular to a rotation axis of the cutting tool, and performing a process of classifying pieces of the generated two-dimensional data into any of a plurality of unit regions, a number of which is greater than or equal to a number of the cutting blades on the plane, and displaying a classification result.

(16) A processing program according to the present disclosure is a processing program to be used in a processing apparatus, the processing program being for causing a computer to function as, an acquisition unit configured to acquire measurement results of a physical quantity indicating a state regarding a load of a cutting tool for milling, the cutting tool being configured to perform a cutting process using two or more cutting blades, at a time of the cutting process, the measurement results being obtained by a plurality of sensors, a generation unit configured to generate, based on the measurement results obtained by each of the sensors at a plurality of measurement timings, the measurement results being acquired by the acquisition unit, two-dimensional data for each of the measurement timings, the two-dimensional data regarding the load in two directions on a plane perpendicular to a rotation axis of the cutting tool, and a display processing unit configured to perform a process of classifying pieces of the two-dimensional data generated by the generation unit into any of a plurality of unit regions, a number of which is greater than or equal to a number of the cutting blades on the plane, and displaying a classification result.

An aspect of the present disclosure can be realized not only as a cutting system including such a characteristic processing unit but also as a semiconductor integrated circuit that realizes a part or all of the cutting system. Further, one aspect of the present disclosure can be realized not only as a processing apparatus including such a characteristic processing unit but also as a semiconductor integrated circuit that realizes a part or all of the processing apparatus.

DESCRIPTION OF EMBODIMENTS

Figure 1:
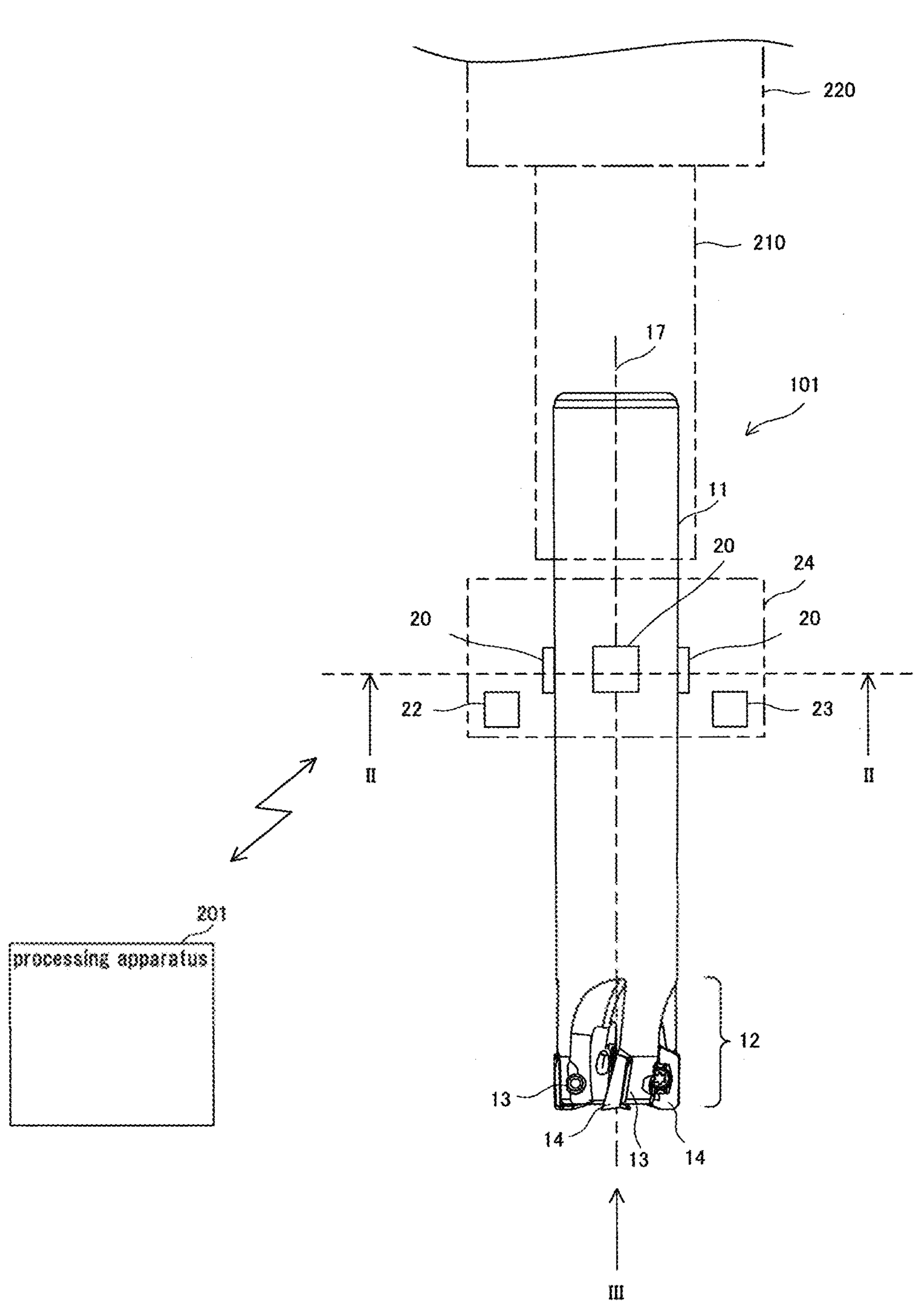
FIG. 1 is a diagram showing a configuration of a cutting system according to an embodiment of the present disclosure.

Conventionally, there has been proposed a technique in which a sensor is attached to a cutting tool and abnormality of a cutting blade in the cutting tool is detected based on measurement results by the sensor at a time of the cutting process.

Problems to be Solved by Present Disclosure

Beyond such a technique of Patent Literature 1, a technique capable of realizing an excellent function related to a cutting blade in a cutting tool is desired.

The present disclosure has been made to solve the above-described problem, and an object thereof is to provide a cutting system, a display system, a processing apparatus, a processing method, and a processing program capable of realizing excellent functions related to a cutting blade in a cutting tool.

Effects of Present Disclosure

According to the present disclosure, excellent functions of a cutting blade in a cutting tool can be realized.

Description of Embodiments of Present Disclosure

First, the contents of the embodiments of the present disclosure will be listed and explained.

(1) A cutting system according to an embodiment of the present disclosure includes a cutting tool for milling, a plurality of sensors, and a processing unit. The cutting tool performs a cutting process using two or more cutting blades, the plurality of sensors measure a physical quantity indicating a state regarding a load of the cutting tool at a time of the cutting process, and the processing unit generates, based on measurement results obtained by each of the sensors at a plurality of measurement timings, two-dimensional data for each of the measurement timings, the two-dimensional data regarding the load in two directions on a plane perpendicular to a rotation axis of the cutting tool, classifies pieces of the generated two-dimensional data into any of a plurality of unit regions, a number of which is greater than or equal to a number of the cutting blades on the plane, and detects, based on the two-dimensional data for each of the unit regions, an abnormality of the cutting blades.

As describe above, each two-dimensional data generated based on the measurement results of the plurality of sensors is classified into any one of the plurality of unit regions in the plane perpendicular to rotation axis, and the abnormality of the cutting blade is detected based on the two dimensional data of each unit region. According to such a configuration, changes in two-dimensional data caused by the occurrence of cutting blade abnormality which occur only in some of unit regions can be detected distinctively from changes in two-dimensional data caused by changes in cutting conditions which occur in all unit regions. Thus, the abnormality of the cutting blade can be detected accurately. Therefore, excellent functions regarding the cutting blade in the cutting tool can be realized.

(2) Preferably, the processing unit classifies the pieces of the two-dimensional data into any of the unit regions, the number of which is equal to the number of the cutting blades.

With such a configuration, the cutting force applied to each cutting blade can be analyzed using the two-dimensional data in each unit region, so that the cutting blade corresponding to the unit region can be specified as the cutting blade in which abnormality has occurred when the two-dimensional data change only in some of unit regions. In addition, the two-dimensional data in each unit region can be used for various analyses other than detection of the abnormality of the cutting blade.

(3) Preferably, the processing unit sequentially generates and classifies the two-dimensional data, and detects, based on the number of the unit regions, for which a temporal change of the two-dimensional data is greater than or equal to a predetermined value, the abnormality of the cutting blades.

With such a configuration, it is possible to more reliably detect a slight change in the two-dimensional data in each unit region, and thus it is possible to more accurately detect the abnormality of the cutting blade.

(4) More preferably, the processing unit calculates an index value based on the two-dimensional data for the plurality of unit regions, calculates a standard deviation of a difference between the index value for each of the unit regions and an average value of the index values for the unit regions, and detects, based on the calculated standard deviation, the abnormality of the cutting blades.

As described above, by focusing on the standard deviation of the difference between the index value of each unit region and the average value of the index values of each of the unit regions, it is possible to more accurately detect a change in the two-dimensional data based on the occurrence of the abnormality of the cutting blade, and thus it is possible to more accurately detect the abnormality of the cutting blade.

(5) More preferably, the cutting system includes the sensors, a number of which is irrelevant to the number of the cutting blades in the cutting tool.

With such a configuration, it is possible to construct a cutting system using various cutting tools and a predetermined number of sensors regardless of the number of the cutting blades.

(6) More preferably, the cutting system includes the sensors, a number of which is less than the number of the cutting blades in the cutting tool.

With such a configuration, it is possible to reduce the number of necessary sensors compared to a system including the sensors, the number of which is equal to the number of the cutting blades, for example, and thus it is possible to construct a cutting system at lower cost.

(7) More preferably, the cutting tool includes a shank portion, and the plurality of sensors are provided in the shank portion.

With such a configuration, since the physical quantity indicating the state of each cutting blade can be measured more accurately, the abnormality of the cutting blade can be detected more accurately.

(8) A processing apparatus according to an embodiment of the present disclosure includes an acquisition unit configured to acquire measurement results of a physical quantity indicating a state regarding a load of a cutting tool for milling, the cutting tool being configured to perform a cutting process using two or more cutting blades, at a time of the cutting process, the measurement results being obtained by a plurality of sensors, a generation unit configured to generate, based on the measurement results obtained by each of the sensors at a plurality of measurement timings, the measurement results being acquired by the acquisition unit, two-dimensional data for each of the measurement timings, the two-dimensional data regarding the load in two directions on a plane perpendicular to a rotation axis of the cutting tool, and a detection unit configured to classify pieces of the two-dimensional data generated by the generation unit into any of a plurality of unit regions, a number of which is greater than or equal to a number of the cutting blades on the plane, and detect, based on the two-dimensional data for each of the unit regions, an abnormality of the cutting blades.

As describe above, each two-dimensional data generated based on the measurement results of the plurality of sensors is classified into any one of the plurality of unit regions in the plane perpendicular to rotation axis, and the abnormality of the cutting blade is detected based on the two dimensional data of each unit region. According to such a configuration, changes in two-dimensional data caused by the occurrence of cutting blade abnormality which occur only in some of unit regions can be detected distinctively from changes in two-dimensional data caused by changes in cutting conditions which occur in all unit regions. Thus, the abnormality of the cutting blade can be detected accurately. Therefore, excellent functions regarding the cutting blade in the cutting tool can be realized.

(9) A processing method according to an embodiment of the present disclosure is a processing method in a processing apparatus, the processing method includes acquiring measurement results of a physical quantity indicating a state regarding a load of a cutting tool for milling, the cutting tool being configured to perform a cutting process using two or more cutting blades, at a time of the cutting process, the measurement results being obtained by a plurality of sensors, generating, based on the acquired measurement results obtained by each of the sensors at a plurality of measurement timings, two-dimensional data for each of the measurement timings, the two-dimensional data regarding the load in two directions on a plane perpendicular to a rotation axis of the cutting tool, and classifying pieces of the generated two-dimensional data into any of a plurality of unit regions, a number of which is greater than or equal to a number of the cutting blades on the plane, and detecting, based on the two-dimensional data for each of the unit regions, an abnormality of the cutting blades.

As describe above, each two-dimensional data generated based on the measurement results of the plurality of sensors is classified into any one of the plurality of unit regions in the plane perpendicular to rotation axis, and the abnormality of the cutting blade is detected based on the two dimensional data of each unit region. According to such a method, changes in two-dimensional data caused by the occurrence of cutting blade abnormality which occur only in some of unit regions can be detected distinctively from changes in two-dimensional data caused by changes in cutting conditions which occur in all unit regions. Thus, the abnormality of the cutting blade can be detected accurately. Therefore, excellent functions regarding the cutting blade in the cutting tool can be realized.

(10) A processing program according to an embodiment of the present disclosure to be used in a processing apparatus, the processing program being for causing a computer to function as an acquisition unit configured to acquire measurement results of a physical quantity indicating a state regarding a load of a cutting tool for milling, the cutting tool being configured to perform a cutting process using two or more cutting blades, at a time of the cutting process, the measurement results being obtained by a plurality of sensors, a generation unit configured to generate, based on the measurement results obtained by each of the sensors at a plurality of measurement timings, the measurement results being acquired by the acquisition unit, two-dimensional data for each of the measurement timings, the two-dimensional data regarding the load in two directions on a plane perpendicular to a rotation axis of the cutting tool, and a detection unit configured to classify pieces of the two-dimensional data generated by the generation unit into any of a plurality of unit regions, a number of which is greater than or equal to a number of the cutting blades on the plane, and detect, based on the two-dimensional data for each of the unit regions, an abnormality of the cutting blades.

As describe above, each two-dimensional data generated based on the measurement results of the plurality of sensors is classified into any one of the plurality of unit regions in the plane perpendicular to rotation axis, and the abnormality of the cutting blade is detected based on the two dimensional data of each unit region. According to such a configuration, changes in two-dimensional data caused by the occurrence of cutting blade abnormality which occur only in some of unit regions can be detected distinctively from changes in two-dimensional data caused by changes in cutting conditions which occur in all unit regions. Thus, the abnormality of the cutting blade can be detected accurately. Therefore, excellent functions regarding the cutting blade in the cutting tool can be realized.

(11) A display system according to an embodiment of the present disclosure includes a cutting tool for milling, a plurality of sensors, and a processing apparatus. The cutting tool performs a cutting process using two or more cutting blades, the plurality of sensors measure a physical quantity indicating a state regarding a load of the cutting tool at a time of the cutting process, and the processing apparatus performs a process of generating, based on measurement results obtained by each of the sensors at a plurality of measurement timings, two-dimensional data for each of the measurement timings, the two-dimensional data regarding the load in two directions on a plane perpendicular to a rotation axis of the cutting tool, classifying pieces of the generated two-dimensional data into any of a plurality of unit regions, a number of which is greater than or equal to a number of the cutting blades on the plane, and displaying a classification result.

As described above, by the configuration of classifying each two-dimensional data generated based on the measurement results of the plurality of sensors into any one of the plurality of unit regions in the plane perpendicular to rotation axis and displaying the classification result, for example, since the state of each cutting blade can be displayed as two-dimensional data for each unit region, the state of each cutting blade can be recognized by the user. Therefore, excellent functions related to the cutting blade in the cutting tool can be realized.

(12) Preferably, the processing apparatus performs a process of displaying, as the classification result, the two-dimensional data in a manner different for each of the unit regions.

With such a configuration, it is possible to display the classification result of the two-dimensional data in a more easily visible manner.

(13) Preferably, the processing apparatus performs a process of sequentially generating and classifying the two-dimensional data, and further displaying information indicating a temporal change of the two-dimensional data for each of the unit regions.

With such a configuration, for example, it is possible to cause the user to recognize a temporal change in the state of the cutting blade as a temporal change in two-dimensional data for each unit region.

(14) A processing apparatus according to an embodiment of the present disclosure includes an acquisition unit configured to acquire measurement results of a physical quantity indicating a state regarding a load of a cutting tool for milling, the cutting tool being configured to perform a cutting process using two or more cutting blades, at a time of the cutting process, the measurement results being obtained by a plurality of sensors, a generation unit configured to generate, based on the measurement results obtained by each of the sensors at a plurality of measurement timings, the measurement results being acquired by the acquisition unit, two-dimensional data for each of the measurement timings, the two-dimensional data regarding the load in two directions on a plane perpendicular to a rotation axis of the cutting tool, and a display processing unit configured to perform a process of classifying pieces of the two-dimensional data generated by the generation unit into any of a plurality of unit regions, a number of which is greater than or equal to a number of the cutting blades on the plane, and displaying a classification result.

As described above, by the configuration of classifying each two-dimensional data generated based on the measurement results of the plurality of sensors into any one of the plurality of unit regions in the plane perpendicular to rotation axis and displaying the classification result, for example, since the state of each cutting blade can be displayed as two-dimensional data for each unit region, the state of each cutting blade can be recognized by the user. Therefore, excellent functions related to the cutting blade in the cutting tool can be realized.

(15) A processing method according to an embodiment of the present disclosure is a processing method in a processing apparatus, the processing method includes acquiring measurement results of a physical quantity indicating a state regarding a load of a cutting tool for milling, the cutting tool being configured to perform a cutting process using two or more cutting blades, at a time of the cutting process, the measurement results being obtained by a plurality of sensors, generating, based on the acquired measurement results obtained by each of the sensors at a plurality of measurement timings, two-dimensional data for each of the measurement timings, the two-dimensional data regarding the load in two directions on a plane perpendicular to a rotation axis of the cutting tool, and performing a process of classifying pieces of the generated two-dimensional data into any of a plurality of unit regions, a number of which is greater than or equal to a number of the cutting blades on the plane, and displaying a classification result.

As described above, by the method of classifying each two-dimensional data generated based on the measurement results of the plurality of sensors into any one of the plurality of unit regions in the plane perpendicular to rotation axis and displaying the classification result, for example, since the state of each cutting blade can be displayed as two-dimensional data for each unit region, the state of each cutting blade can be recognized by the user. Therefore, excellent functions related to the cutting blade in the cutting tool can be realized.

(16) A processing program according to an embodiment of the present disclosure is a processing program to be used in a processing apparatus, the processing program being for causing a computer to function as an acquisition unit configured to acquire measurement results of a physical quantity indicating a state regarding a load of a cutting tool for milling, the cutting tool being configured to perform a cutting process using two or more cutting blades, at a time of the cutting process, the measurement results being obtained by a plurality of sensors, a generation unit configured to generate, based on the measurement results obtained by each of the sensors at a plurality of measurement timings, the measurement results being acquired by the acquisition unit, two-dimensional data for each of the measurement timings, the two-dimensional data regarding the load in two directions on a plane perpendicular to a rotation axis of the cutting tool, and a display processing unit configured to perform a process of classifying pieces of the two-dimensional data generated by the generation unit into any of a plurality of unit regions, a number of which is greater than or equal to a number of the cutting blades on the plane, and displaying a classification result.

As described above, by the configuration of classifying each two-dimensional data generated based on the measurement results of the plurality of sensors into any one of the plurality of unit regions in the plane perpendicular to rotation axis and displaying the classification result, for example, since the state of each cutting blade can be displayed as two-dimensional data for each unit region, the state of each cutting blade can be recognized by the user. Therefore, excellent functions related to the cutting blade in the cutting tool can be realized.

Hereinafter, embodiments of the present disclosure will be described with reference to the drawings. In the drawings, the same or corresponding portions are denoted by the same reference numerals, and description thereof will not be repeated. Further, at least a part of the embodiments described below may be arbitrarily combined.

[Cutting System]

FIG. 1 is a diagram showing a configuration of a cutting system according to an embodiment of the present disclosure.

Referring to FIG. 1, a cutting system 301 includes a cutting tool 101 for milling, a plurality of strain sensors 20, and a processing apparatus 201. Cutting system 301 is an example of a display system. Processing apparatus 201 is an example of a processing unit in cutting system 301.

[Cutting Tool]

Cutting tool 101 performs a cutting process using two or more cutting blades. Cutting tool 101 is, for example, an end mill used in a machine tool such as a milling machine, and is used for milling a cutting object made of metal or the like. Cutting tool 101 is, for example, an indexable end mill. Cutting tool 101 is used in a state of being held by a tool holder 210 such as an arbor.

Tool holder 210 is attached to a main shaft 220 of the machine tool. Main shaft 220 has a columnar shape and applies a rotational force to tool holder 210. Tool holder 210 is a columnar member disposed on an extension line of main shaft 220. Specifically, an upper end portion of tool holder 210 is held by main shaft 220. Further, a lower end portion of tool holder 210 holds cutting tool 101.

Cutting tool 101 includes a shank portion 11, a housing 24, a battery 22, a wireless communication apparatus 23, and a blade attaching portion 12. In FIG. 1, housing 24 is indicated by a two dot chain line which is an imaginary line.

Blade attaching portion 12 is provided closer to the distal end than shank portion 11 in cutting tool 101. Blade attaching portion 12 includes, for example, four blade fixing portions 13. A cutting blade 14 is attached to each blade fixing portion 13.

For example, strain sensor 20 is provided in shank portion 11 of cutting tool 101. More specifically, strain sensor 20 is attached to the peripheral surface of shank portion 11 via, for example, an adhesive or a glue.

Housing 24 houses strain sensor 20 attached to shank portion 11. Specifically, housing 24 includes a bottom plate portion and a side wall portion (not shown). Housing 24 covers strain sensor 20 from below and from the side.

Battery 22 and wireless communication apparatus 23 are housed in housing 24. For example, battery 22 and wireless communication apparatus 23 are fixed to the bottom plate portion or the side wall portion of housing 24. Wireless communication apparatus 23 includes a communication circuit such as a communication integrated circuit (IC), for example.

Battery 22 is connected to strain sensor 20 and wireless communication apparatus 23 via a power line (not shown). Battery 22 supplies power to strain sensor 20 and wireless communication apparatus 23 via the power line. The power line is provided with a switch for switching on and off of power supply.

For example, cutting system 301 includes strain sensors 20, and a number of which is irrelevant to the number of cutting blades 14 in cutting tool 101. Further, for example, cutting system 301 includes strain sensors 20, a number of which is less than the number of cutting blades 14 in cutting tool 101. More specifically, cutting system 301 includes, for example, three strain sensors 20.

Figure 2:
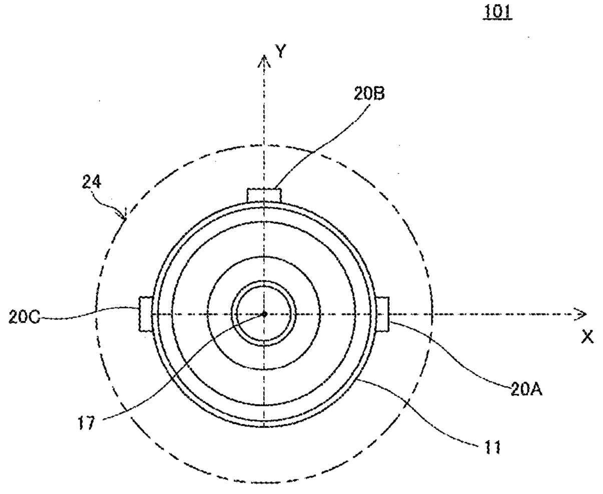
FIG. 2 is a cross-sectional view showing a configuration of a cutting tool according to an embodiment of the present disclosure.

FIG. 2 is a cross-sectional view showing a configuration of a cutting tool according to an embodiment of the present disclosure. FIG. 2 is a cross-sectional view viewing from the arrow direction of line II-II in FIG. 1.

Referring to FIG. 2, strain sensors 20A, 20B, and 20C are provided on shank portion 11 as strain sensors 20. Strain sensor 20B is provided at a position shifted by 90° from the position at which strain sensor 20C is provided in the circumferential direction of shank portion 11. Strain sensor 20A is provided at a position shifted by 90° from the position at which strain sensor 20B is provided in the circumferential direction of shank portion 11. Strain sensors 20A and 20C are provided at positions that are point-symmetric with respect to a rotation axis 17 of shank portion 11. For example, strain sensors 20A, 20B, and 20C may be provided at the same position in the direction along rotation axis 17 of shank portion 11, or may be provided at positions different from each other.

Strain sensors 20A, 20B, and 20C may be provided on the peripheral surface of shank portion 11 as described above, for example, regardless of the position of blade attaching portion 12. That is, strain sensors 20A, 20B, and 20C do not need to be provided at positions along rotation axis 17 from blade fixing portion 13 on the peripheral surface of shank portion 11.

Hereinafter, for the sake of description, in a plane orthogonal to rotation axis 17, a direction from rotation axis 17 to a position where strain sensor 20A is provided is referred to as an X direction, and a direction from rotation axis 17 to the position where strain sensor 20B is provided is referred to as a Y direction.

Figure 3:
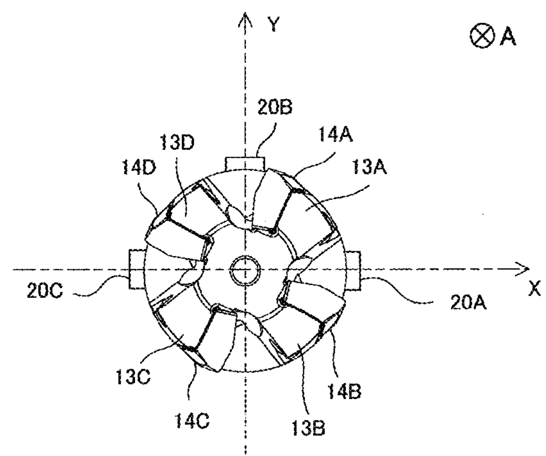
FIG. 3 is an arrow view showing a configuration of a cutting tool according to an embodiment of the present disclosure.

FIG. 3 is an arrow view showing a configuration of a cutting tool according to an embodiment of the present disclosure. FIG. 3 is an arrow view seen from the direction III in FIG. 1.

Referring to FIG. 3, blade attaching portion 12 includes blade fixing portions 13A, 13B, 13C, and 13D as blade fixing portions 13. Blade fixing portions 13A, 13B, 13C, and 13D are provided in this order at positions shifted by 90° in the clockwise direction in the circumferential direction of blade attaching portion 12.

Cutting blades 14A, 14B, 14C and 14D are attached to blade fixing portions 13A, 13B, 13C and 13D, respectively as cutting blades 14.

Cutting blade 14 is, for example, an indexable insert. Cutting blade 14 is attached to blade fixing portion 13, for example by screwing. Note that cutting blade 14 may be fixed to blade fixing portion 13 by means other than screwing. Further, cutting tool 101 may be a so-called solid end mill including cutting blade 14 integrated with shank portion 11 instead of blade attaching portion 12.

Strain sensor 20 measures a physical quantity indicating a state regarding a load of cutting tool 101 at a time of the cutting process. More specifically, strain sensor 20 measures a strain ε of shank portion 11 in a direction parallel to rotation axis 17 as the physical quantity indicative of the load-related state of cutting tool 101 at the time of the cutting process.

Figure 4:
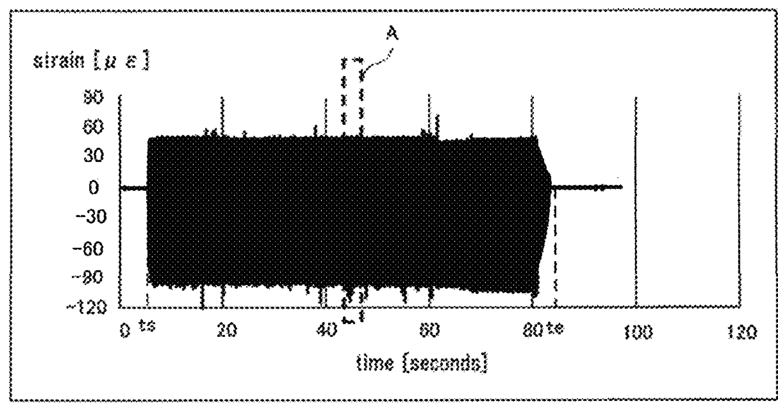
FIG. 4 is a diagram showing an example of measurement results of a strain sensor acquired by a wireless communication unit in a processing apparatus according to an embodiment of the present disclosure.
Figure 5:
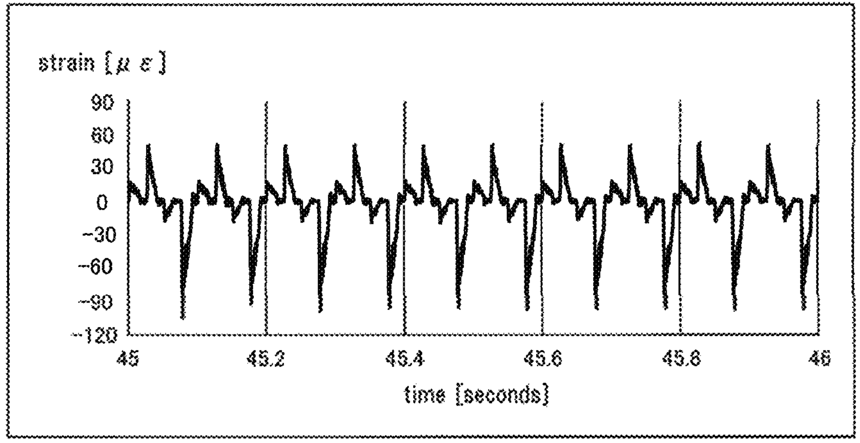
FIG. 5 is a diagram showing an example of measurement results of a strain sensor acquired by a wireless communication unit in a processing apparatus according to an embodiment of the present disclosure.
Figure 6:
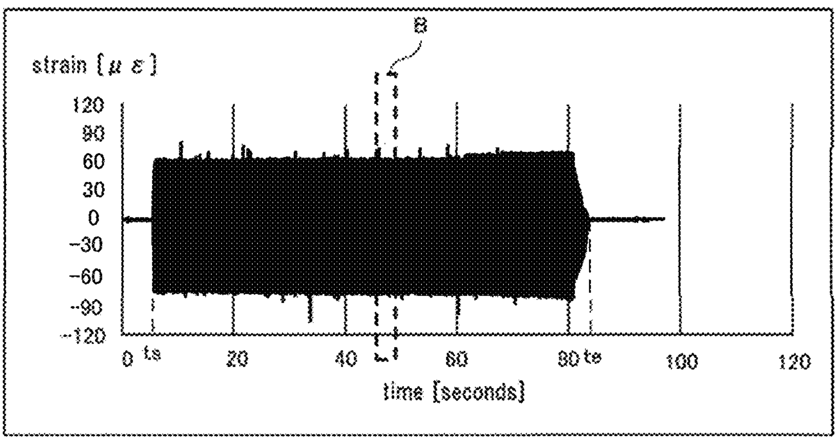
FIG. 6 is a diagram showing an example of measurement results of a strain sensor acquired by a wireless communication unit in a processing apparatus according to an embodiment of the present disclosure.
Figure 7:
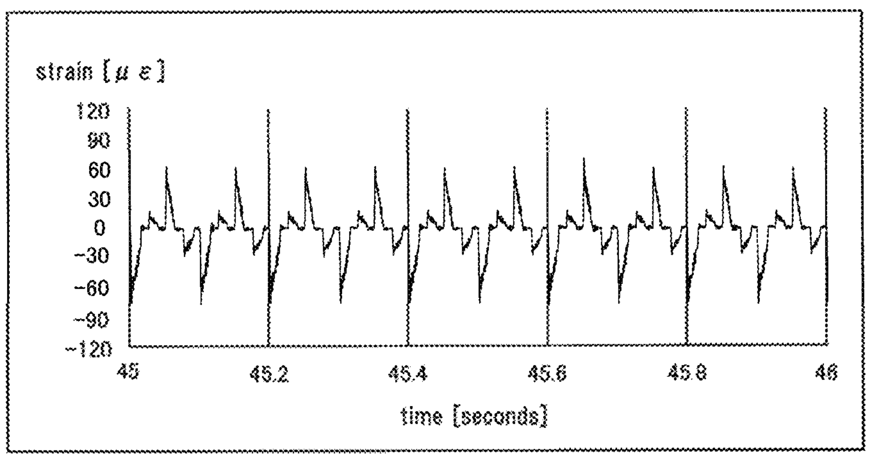
FIG. 7 is a diagram showing an example of measurement results of a strain sensor acquired by a wireless communication unit in a processing apparatus according to an embodiment of the present disclosure.

FIGS. 4 to 7 are diagrams showing an example of measurement results of strain sensors acquired by a wireless communication unit in a processing apparatus according to an embodiment of the present disclosure. FIG. 4 is a time-series measurement results of strain ε by strain sensor 20A, and FIG. 5 is an enlarged view of region A in FIG. 4. FIG. 6 is a time-series measurement results of strain ε by strain sensor 20B, and FIG. 7 is an enlarged view of region B in FIG. 6. In FIGS. 4 to 7, the horizontal axis represents time [seconds], and the vertical axis represents strain [με].

Referring to FIGS. 4 to 7, for example, strain sensor 20 measures strain ε in a period from time ts, which is a start time of the cutting process, to time te, which is an end time of the cutting process, and transmits an analog signal having a level corresponding to strain ε to wireless communication apparatus 23 via a signal line (not shown), for example.

Wireless communication apparatus 23 performs analog-to-digital (AD) conversion on the analog signal received from strain sensor 20 at a predetermined sampling period, and generates a sensor measurement value that is a digital value after the conversion. More specifically, wireless communication apparatus 23 generates the sensor measurement value sx by performing AD conversion on the analog signal of strain ε received from strain sensor 20A, generates the sensor measurement value sy by performing AD conversion on the analog signal of strain ε received from strain sensor 20B, and generates the sensor measurement value sr by performing AD conversion on the analog signal of strain received from strain sensor 20C.

Wireless communication apparatus 23 adds a time stamp indicating a sampling timing to each of the generated sensor measurement values sx, sy, sr, and stores the sensor measurement values sx, sy, sr to which the time stamps are added in a storage unit (not shown).

Wireless communication apparatus 23 acquires one or a plurality of sets of the sensor measurement values sx, sy, sr from the storage unit, generates a wireless signal including acquired sensor measurement values sx, sy, sr and an identification information of corresponding strain sensor 20, and transmits the generated wireless signal to processing apparatus 201, for example, in a predetermined cycle.

[Processing Apparatus]

Figure 8:
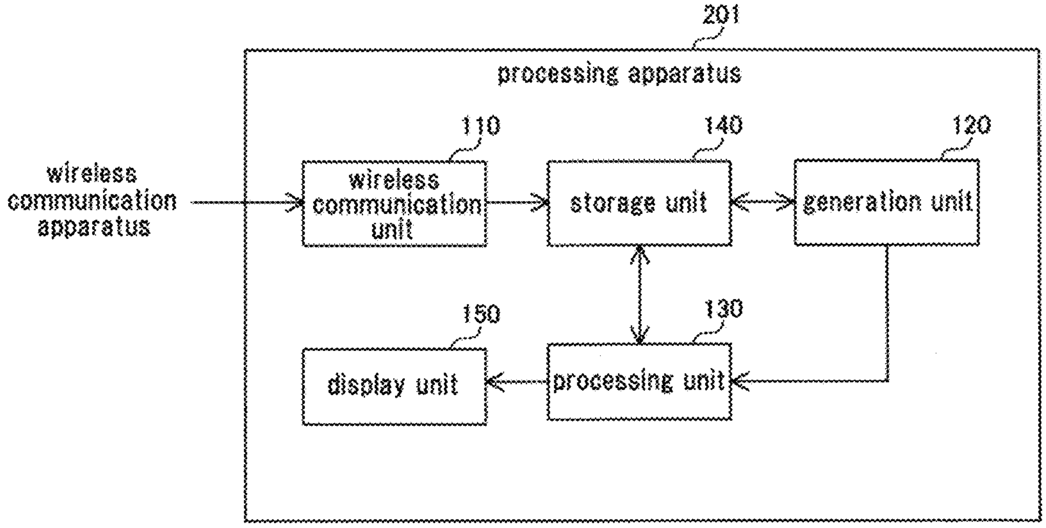
FIG. 8 is a diagram showing a configuration of a processing apparatus in a cutting system according to an embodiment of the present disclosure.

FIG. 8 is a diagram showing a configuration of a processing apparatus in a cutting system according to an embodiment of the present disclosure.

Referring to FIG. 8, processing apparatus 201 includes a wireless communication unit 110, a generation unit 120, a processing unit 130, a storage unit 140, and a display unit 150. Wireless communication unit 110 is an example of an acquisition unit. Processing unit 130 is an example of a detection unit and an example of a display processing unit.

Wireless communication unit 110 is realized by a communication circuit such as a communication IC, for example. Generation unit 120 and processing unit 130 are realized by processors such as a central processing unit (CPU) and a digital signal processor (DSP), for example. Storage unit 140 is, for example, a nonvolatile memory. Display unit 150 is, for example, a display. Note that display unit 150 may be provided outside processing apparatus 201.

(Wireless Communication Unit)

Wireless communication unit 110 acquires measurement results by strain sensor 20 that measures the physical quantity indicating the state related to the load of cutting tool 101 at a time of the cutting process.

More specifically, wireless communication unit 110 performs wireless communication with wireless communication apparatus 23 in cutting tool 101. Wireless communication apparatus 23 and wireless communication unit 110 perform wireless communication using a communication protocol such as ZigBee conforming to IEEE802.15.4, Bluetooth (trade mark) conforming to IEEE802.15.1, and UWB (Ultra Wide Band) conforming to IEEE802.15.3a. A communication protocol other than the above may be used between wireless communication apparatus 23 and wireless communication unit 110.

Wireless communication unit 110 acquires the sensor measurement values sx, sy, sr and the identification information from the wireless signal received from wireless communication apparatus 23 in cutting tool 101. Then, wireless communication unit 110 stores the sensor measurement values sx, sy, sr in storage unit 140 in association with the identification information.

(Generation Unit)

Generation unit 120 generates two-dimensional data D for each measurement timing related to the load in two directions on a plane perpendicular to rotation axis 17 of shank portion 11 in cutting tool 101 based on the measurement results by each strain sensor 20 at a plurality of measurement timings, which are acquired by wireless communication unit 110.

When the sensor measurement values sx, sy, and sr are stored in storage unit 140 by wireless communication unit 110, generation unit 120 generates two-dimensional data D based on the sensor measurement values sx, sy, and sr stored in storage unit 140.

Figure 9:
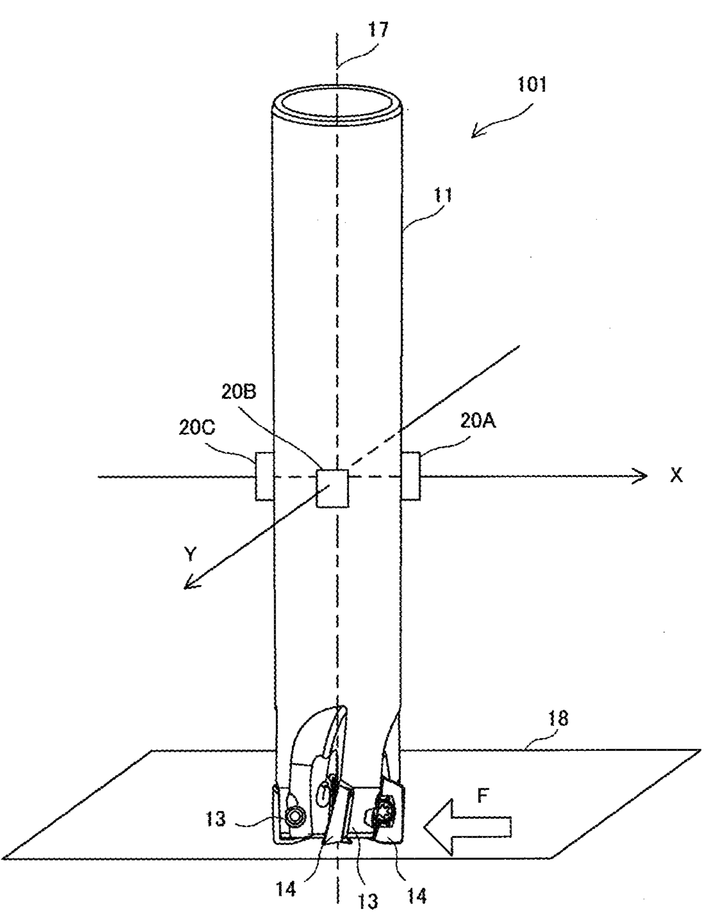
FIG. 9 is a perspective view schematically showing a cutting tool according to an embodiment of the present disclosure.

FIG. 9 is a perspective view schematically showing a cutting tool according to an embodiment of the present disclosure.

Referring to FIG. 9, when the cutting process is performed by cutting tool 101, a load, i.e., a cutting force F [N] is applied from the cutting object to cutting blade 14.

For example, generation unit 120 generates, based on sensor measurement values sx, sy, and sr, two-dimensional data D indicating a moment Mx generated by the load in the X direction and a moment My generated by the load in the Y direction in a cutting resistance acting surface 18 which is a plane perpendicular to rotation axis 17 of shank portion 11 and which passes through cutting blade 14.

More specifically, storage unit 140 stores a conversion formula for converting the sensor measurement values sx, sy, and sr into moments Mx and My. For example, the conversion formula is created in advance using a technique described in Patent Literature 5 and Patent Literature 6. More specifically, the conversion formula is a conversion matrix created in advance based on the sensor measurement values sx, sy, and sr obtained when a known load is applied to cutting tool 101.

Generation unit 120 generates two-dimensional data D indicating moments Mx and My based on the sensor measurement values sx, sy, sr and the transformation matrix in storage unit 140.

Generation unit 120 sequentially generates two-dimensional data D. More specifically, generation unit 120 generates two-dimensional data D each time the sensor measurement values sx, sy, and sr are stored in storage unit 140 by wireless communication unit 110, and outputs the generated two-dimensional data D to processing unit 130.

Note that generation unit 120 may be configured to generate, based on sensor measurement values sx, sy, sr without using the conversion matrix, two-dimensional data D indicating strain ε at the position where strain sensor 20A is provided and strain ε at the position where strain sensor 20B is provided.

(Processing Unit)

Figure 10:
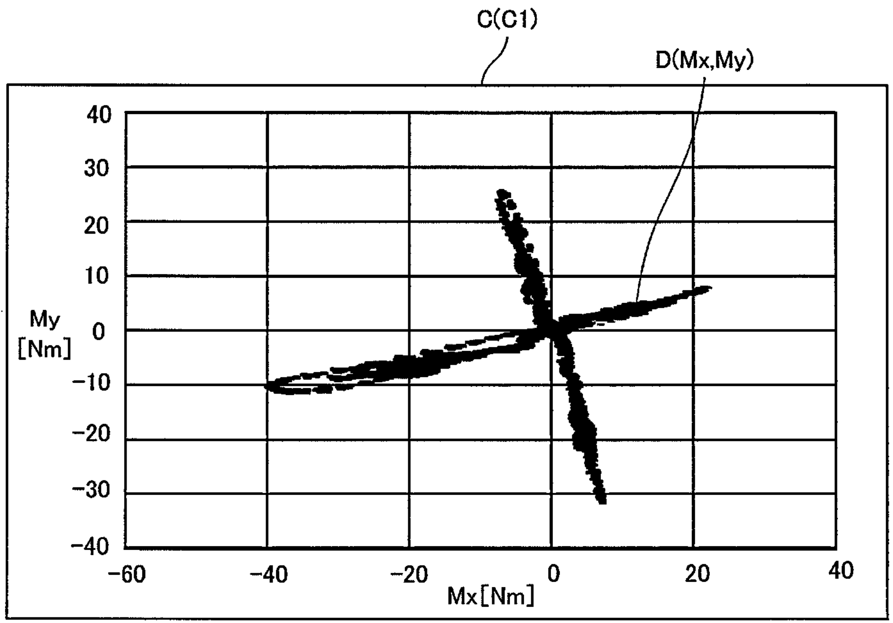
FIG. 10 is a diagram showing an example of two-dimensional data generated by a generation unit in a processing apparatus according to an embodiment of the present disclosure.

FIG. 10 is a diagram showing an example of two-dimensional data generated by a generation unit in a processing apparatus according to an embodiment of the present disclosure. In FIG. 10, about 8000 pieces of two-dimensional data D generated based on the sensor measurement values sx, sy, sr in a period before the abnormality occurs in cutting blade 14 are plotted on a two-dimensional coordinate C (C1) in which the vertical axis is moment Mx [Nm] and the horizontal axis is moment My [Nm].

Figure 11:
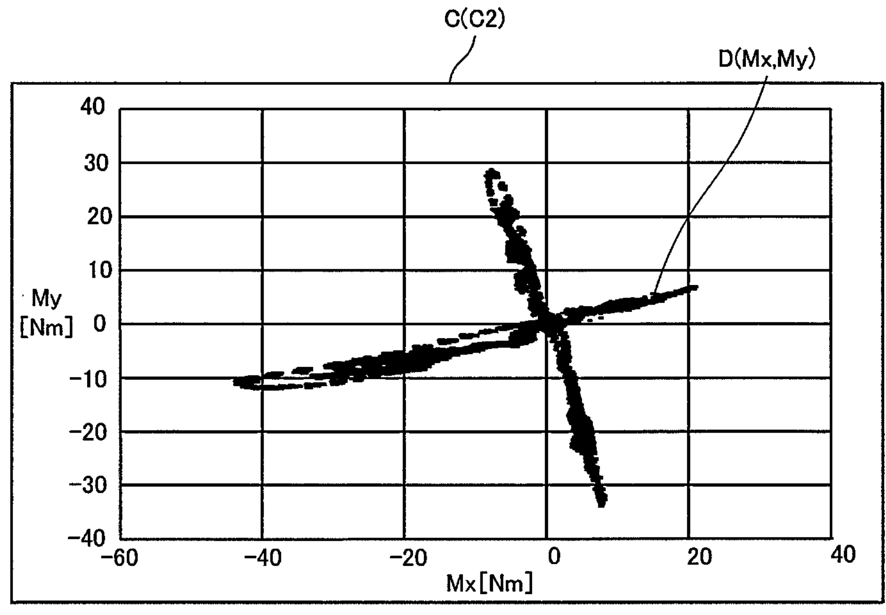
FIG. 11 is a diagram showing another example of two-dimensional data generated by a generation unit in a processing apparatus according to an embodiment of the present disclosure.

FIG. 11 is a diagram showing another example of two-dimensional data generated by a generation unit in a processing apparatus according to the embodiment of the present disclosure. In FIG. 11, about 8000 pieces of two-dimensional data D generated based on the sensor measurement values sx, sy, sr in a period after certain cutting blade 14 is lacked are plotted on a two-dimensional coordinate C (C2) in which the vertical axis is moment Mx [Nm] and the horizontal axis is moment My [Nm].

Referring to FIGS. 10 and 11, a slight change occurs in two-dimensional data D generated by generation unit 120 before and after cutting blade 14 is lacked. Processing unit 130 detects abnormality such as a lack of cutting blade 14 by analyzing two-dimensional data D generated by generation unit 120.

More specifically, processing unit 130 performs classification processing which is processing of classifying each two-dimensional data D generated by generation unit 120 into any one of a plurality of unit regions A whose number is equal to or greater than the number of cutting blades 14 in the plane perpendicular to rotation axis 17. For example, as classification processing, processing unit 130 classifies each two-dimensional data D into any one of a plurality of unit regions A in two-dimensional coordinate C1. Then, processing unit 130 performs detection processing which is a process of detecting the abnormality of cutting blade 14 based on two-dimensional data D for each unit region.

Unit region A is each region when 360 degrees is divided into n. Here, n is an integer equal to or greater than the number of cutting blades 14. For example, unit region A is each region when a plane perpendicular to rotation axis 17 is equally divided into n regions around rotation axis 17 by a plurality of straight lines that are on the plane and pass through rotation axis 17. Alternatively, unit region A is each region when two-dimensional coordinate C1 is divided into n equal parts around the origin by a plurality of straight lines passing through the origin.

(Classification Processing)

Figure 12:
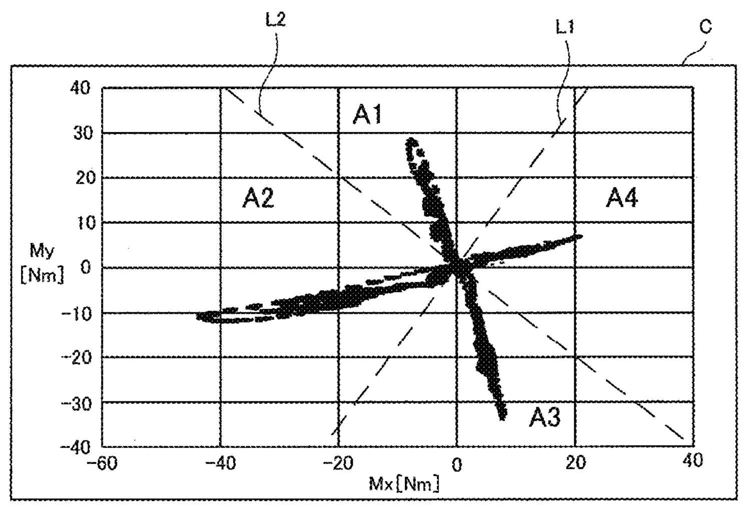
FIG. 12 is a diagram showing an example of a classification result of two-dimensional data by a processing unit in a processing apparatus according to an embodiment of the present disclosure.

FIG. 12 is a diagram showing an example of a classification result of two-dimensional data by a processing unit in a processing apparatus according to an embodiment of the present disclosure.

Referring to FIG. 12, two-dimensional data D generated by generation unit 120 has a substantially cross shape on two-dimensional coordinate C, and can be classified into four data groups extending from the origin. Here, each data group corresponds to the cutting force F received by each cutting blade 14 of cutting tool 101.

Therefore, for example, processing unit 130 classifies a plurality of two-dimensional data D received from generation unit 120 into any one of unit regions A, the number of which is equal to the number of cutting blades 14. That is, processing unit 130 classifies each two-dimensional data D into any one of unit regions A1, A2, A3, and A4 which are four unit regions A in two-dimensional coordinate C. Unit regions A1, A2, A3, and A4 are regions obtained by dividing two-dimensional coordinate C1 into four equal parts around the origin by two straight lines passing through the origin of two-dimensional coordinate C1.

More specifically, unit regions A1, A2, A3, and A4 are regions partitioned by boundary lines L1 and L2, which are two straight lines passing through the origin in two-dimensional coordinate C and orthogonal to each other, in two-dimensional coordinate C.

For example, storage unit 140 stores a quadratic function F1 indicating boundary line L1 and a quadratic function F2 indicating boundary line L2. For example, processing unit 130 generates quadratic functions F1 and F2 based on the plurality of two-dimensional data D received from generation unit 120 in advance, and stores generated quadratic functions F1 and F2 in storage unit 140. The process of generating quadratic functions F1 and F2 will be described later.

In addition, for example, storage unit 140 stores correspondence information R indicating a correspondence relationship between each unit region A and each cutting blade 14. For example, the correspondence information R is generated in advance based on two-dimensional data D generated based on the sensor measurement values sx, sy, sr acquired in processing apparatus 201 at a time of the cutting process using cutting blade 14 for testing. Hereinafter, it is assumed that unit region A1 corresponds to cutting blade 14A, unit region A2 corresponds to cutting blade 14B, unit region A3 corresponds to cutting blade 14C, and unit region A4 corresponds to cutting blade 14D.

Upon receiving two-dimensional data D from generation unit 120, processing unit 130 determines unit region A to which moments Mx and My belong based on moments Mx and My indicated by the received two-dimensional data D and quadratic functions F1 and F2 in storage unit 140, and classifies two-dimensional data D into the determined unit region A.

For example, processing unit 130 sequentially performs classification of two-dimensional data D received from generation unit 120. More specifically, each time processing unit 130 receives two-dimensional data D from generation unit 120, processing unit 130 classifies the received two-dimensional data D into one of unit regions A. When processing unit 130 classifies two-dimensional data D into any one of unit regions A, processing unit 130 assigns classification information indicating unit region A of the classification destination to two-dimensional data D, and stores two-dimensional data D to which the classification information is assigned in storage unit 140.

Hereinafter, two-dimensional data D classified into unit region A1 is referred to as "two-dimensional data D1", two-dimensional data D classified into unit region A2 is referred to as "two-dimensional data D2", two-dimensional data D classified into unit region A3 is referred to as "two-dimensional data D3", and two-dimensional data D classified into unit region A4 is referred to as "two-dimensional data D4".

(Detection Processing)

For example, processing unit 130 performs the detection processing based on the number of unit regions A in which the temporal change of two-dimensional data D is greater than or equal to a predetermined value.

For example, processing unit 130 calculates an index value based on two-dimensional data D of each of the plurality of unit regions A. Then, processing unit 130 performs detection processing based on the calculated temporal change of the index value.

More specifically, when processing unit 130 classifies two-dimensional data D received from generation unit 120, processing unit 130 calculates a moving standard deviation ms of distance R from the origin of two-dimensional data D in each unit region A as the index value for each unit region A. To be more specific, processing unit 130 calculates a moving standard deviation ms1 of a distance R1 of two-dimensional data D1, a moving standard deviation ms2 of a distance R2 of two-dimensional data D2, a moving standard deviation ms3 of a distance R3 of two-dimensional data D3, and a moving standard deviation ms4 of a distance R4 of two-dimensional data D4.

Figure 13:
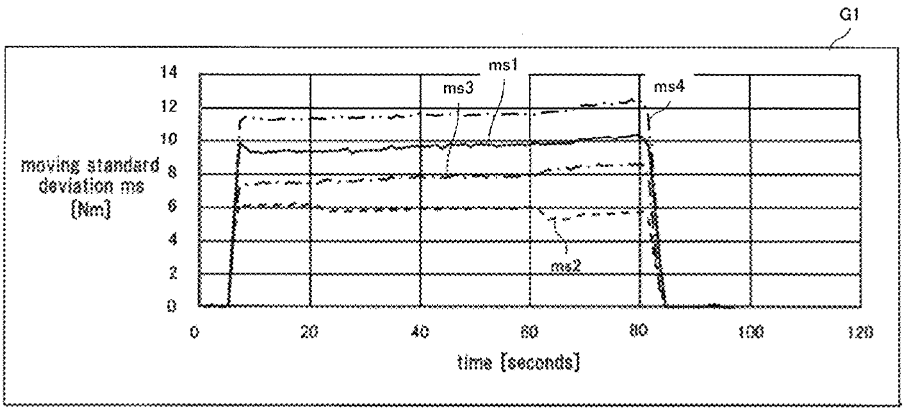
FIG. 13 is a diagram showing an example of a moving standard deviation ms calculated by a processing unit in a processing apparatus according to an embodiment of the present disclosure.

FIG. 13 is a diagram showing an example of moving standard deviation ms calculated by a processing unit in a processing apparatus according to an embodiment of the present disclosure. FIG. 13 shows a graph G1 in which the horizontal axis represents time [seconds] and the vertical axis represents moving standard deviation ms [Nm]. In FIG. 13, a solid line indicates moving standard deviation ms1, a broken line indicates moving standard deviation ms2, a one dot chain line indicates moving standard deviation ms3, and a two dot chain line indicates moving standard deviation ms4.

Referring to FIG. 13, processing unit 130 performs detection processing based on the calculated temporal change of moving standard deviation ms.

Here, each moving standard deviation ms is a value corresponding to the cutting force F received by each cutting blade 14 in cutting tool 101. When a cutting condition such as a depth of cut changes, moving standard deviations ms in all unit regions A change due to the changes in the cutting forces F received by all cutting blades 14 according to the change in the cutting condition. On the other hand, when abnormalities occur in some of cutting blades 14, only moving standard deviations ms in unit regions A corresponding to cutting blades 14 change due to the changes in the cutting forces F received by cutting blades 14 in which the abnormalities have occurred.

Therefore, processing unit 130 monitors the change of each moving standard deviation ms, and determines that the change of moving standard deviation ms is not caused by the abnormality of cutting blade 14 when all moving standard deviations ms are changed by a predetermined value or more, while determines that the abnormality occurs in cutting blade 14 when detecting that some of moving standard deviations ms are changed by a predetermined value or more.

However, the change in moving standard deviation ms due to the occurrence of the abnormality in cutting blade 14 is minute and may not be easily detected. Therefore, for example, processing unit 130 calculates a moving standard deviation MS of difference Dms between each moving standard deviation ms of each unit region A and an average value Ams of moving standard deviations ms of each unit region A.

More specifically, processing unit 130 calculates average value Ams of moving standard deviations ms1 to ms4. Then, processing unit 130 calculates moving standard deviation Ms of difference Dms between each moving standard deviation ms and average value Ams of the moving standard deviations ms. To be more specific, processing unit 130 calculates a moving standard deviation MS1 of difference Dms1 between moving standard deviation ms1 and average value Ams, a moving standard deviation MS2 of difference Dms2 between moving standard deviation ms2 and average value Ams, a moving standard deviation MS3 of a difference Dms3 between moving standard deviation ms3 and average value Ams, and a moving standard deviation MS4 of a difference Dms4 between moving standard deviation ms4 and average value Ams.

Figure 14:
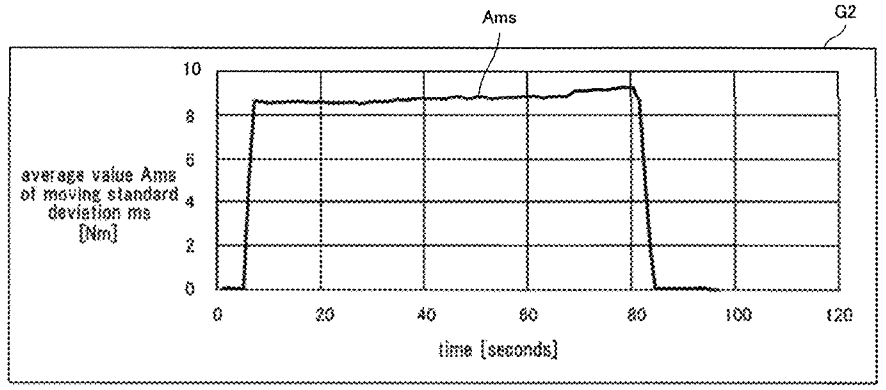
FIG. 14 is a diagram showing an example of an average value Ams calculated by a processing unit in a processing apparatus according to an embodiment of the present disclosure.

FIG. 14 is a diagram showing an example of average value Ams calculated by the processing unit in the processing apparatus according to the embodiment of the present disclosure. FIG. 14 shows a graph G2 in which the horizontal axis represents time (seconds) and the vertical axis represents average value Ams (Nm).

Figure 15:
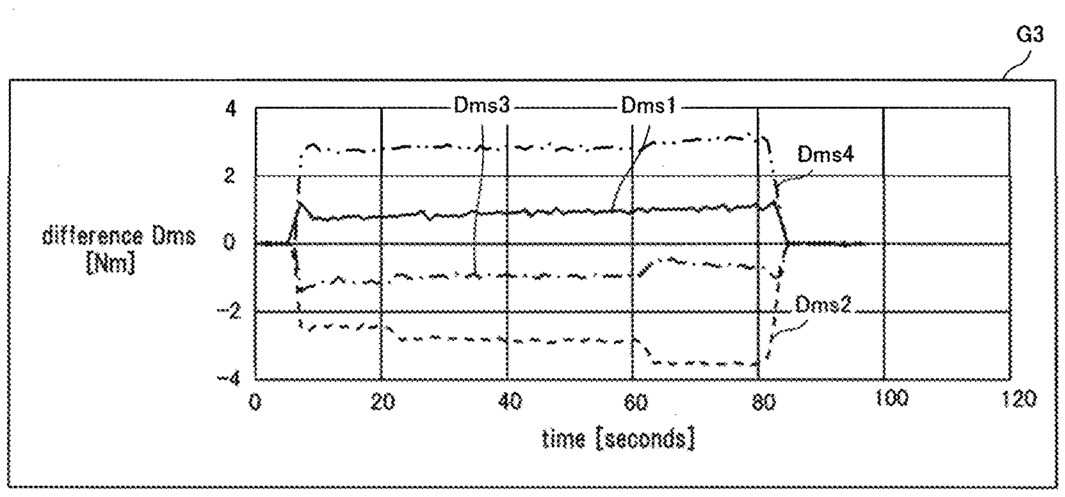
FIG. 15 is a diagram showing an example of a difference Dms calculated by a processing unit in a processing apparatus according to an embodiment of the present disclosure.

FIG. 15 is a diagram showing an example of difference Dms calculated by the processing unit in the processing apparatus according to the embodiment of the present disclosure. FIG. 15 shows a graph G3 in which the horizontal axis represents time (seconds) and the vertical axis represents difference Dms (Nm). In FIG. 15, a solid line indicates difference Dms1, a broken line indicates difference Dms2, a one dot chain line indicates difference Dms3, and a two dot chain line indicates difference Dms4.

Figure 16:
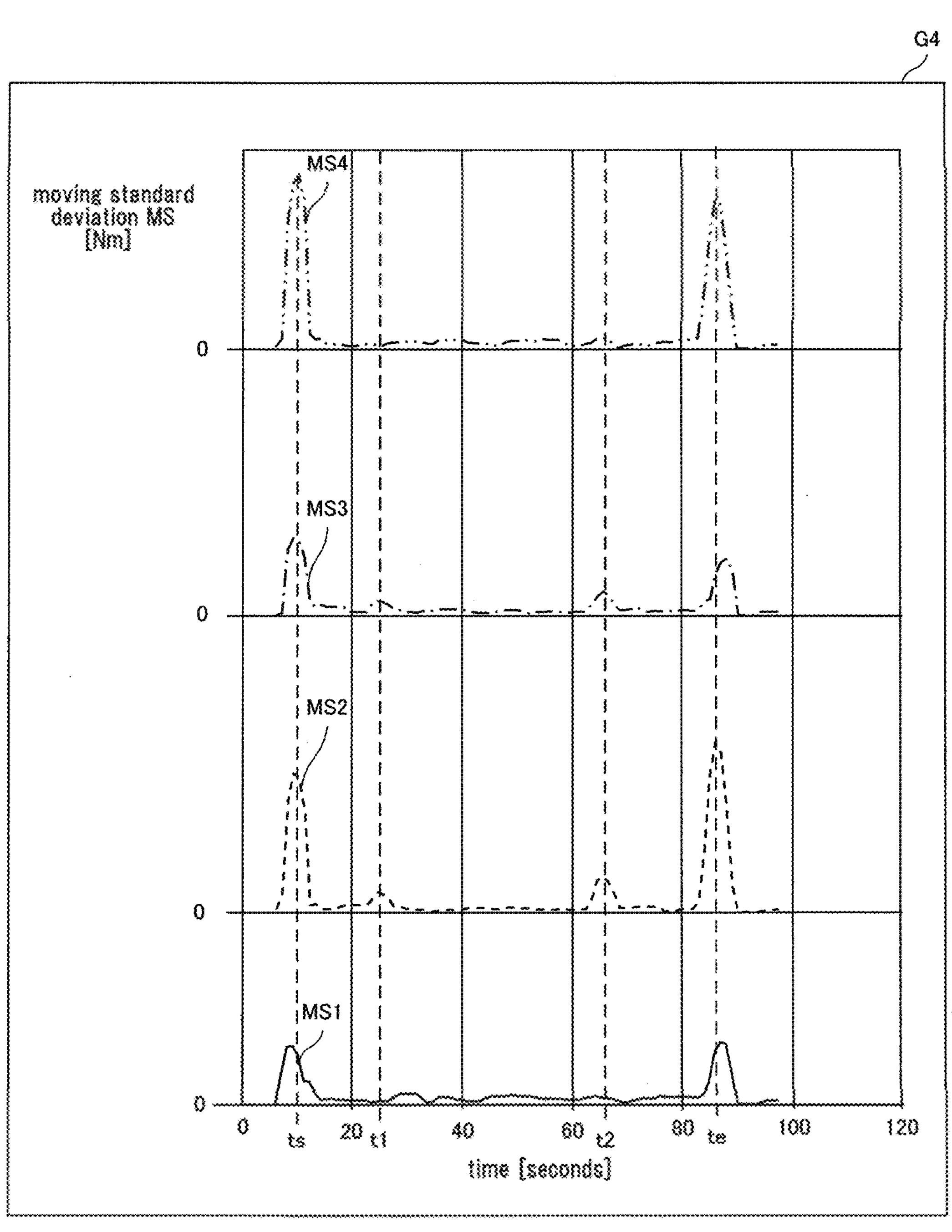
FIG. 16 is a diagram showing an example of a moving standard deviation MS calculated by a processing unit in a processing apparatus according to an embodiment of the present disclosure.

FIG. 16 is a diagram showing an example of moving standard deviation MS calculated by the processing unit in the processing apparatus according to the embodiment of the present disclosure. FIG. 16 shows a graph G4 in which the horizontal axis represents time (seconds) and the vertical axis represents moving standard deviation MS (Nm). In FIG. 16, a solid line indicates moving standard deviation MS1, a broken line indicates moving standard deviation MS2, a one dot chain line indicates moving standard deviation MS3, and a two dot chain line indicates moving standard deviation MS4.

Referring to FIG. 16, for example, processing unit 130 detects the abnormality of cutting blade 14 based on the calculated moving standard deviation MS. More specifically, processing unit 130 monitors a change of each moving standard deviation MS, and determines that the increase in moving standard deviation MS is not caused by the abnormality of cutting blade 14 when all moving standard deviations MS are increased, while determines that the abnormality occurs in cutting blade 14 when detecting that some of moving standard deviations MS are increased.

Specifically, processing unit 130 determines that moving standard deviations MS simultaneously increase at the time ts which is the start time of the cutting process and the time te which is the end time of the cutting process, but determines that the increase in moving standard deviations MS are not caused by the abnormality of cutting blade 14. On the other hand, when processing unit 130 detects that only moving standard deviations MS2 and MS3 have increased at a time t1 and a time t2, processing unit 130 determines that abnormality has occurred in at least one of cutting blades 14B and 14C corresponding to unit regions A2 and A3, respectively, based on the correspondence information R in storage unit 140.

Here, when certain cutting blade 14 is lacked, the cutting amount of such cutting blade 14 is reduced, and thus the cutting force F in cutting blade 14 that comes into contact with the cutting object next to such cutting blade 14 is increased. To be specific, when cutting blade 14A is lacked, the cutting force F in cutting blade 14B that comes into contact with the cutting object next to cutting blade 14A is increased. As a result, not only moving standard deviation MS1 corresponding to lacked cutting blade 14A but also moving standard deviation MS2 corresponding to cutting blade 14B that comes into contact with the cutting object immediately after cutting blade 14A comes into contact with the cutting object may be increased.

Therefore, when moving standard deviations MS2 and MS3 in plurality of adjacent unit regions A2 and A3 increase, processing unit 130 determines that cutting blade 14B that first comes into contact with the cutting object among cutting blades 14B and 14C corresponding to moving standard deviations MS2 and MS3 that successively come into contact with the cutting object is broken.

As is clear from FIG. 13 and FIG. 15, the difference in the amount of change in moving standard deviation MS for each unit region A is larger than the difference in the amount of change in moving standard deviation ms for each unit region A. Therefore, by performing detection processing using moving standard deviation MS, it is possible to more easily detect the abnormality in cutting blade 14.

(Regarding Mobile Standard Deviation MS)

Hereinafter, the significance of calculating moving standard deviation MS of difference Dms between moving standard deviation ms and average value Ams will be described in detail.

After the start of the cutting process using cutting tool 101, a cutting force Fn applied to cutting blade 14 that cuts into the cutting object the n-th is represented by the following equation (1).

[Equation 1]

$$Fn=K(ap+hn)\times(fz+rn-r(n-1)) \tag{1}$$

Here, K is a specific cutting force. Ap is a cutting amount in the direction of rotation axis 17 of cutting blade 14. Hn is a positional deviation in the direction of rotation axis 17 of cutting blade 14 that cuts into the cutting object the n-th. Fz is a feed rate per blade. Rn is a positional deviation in the radial direction of shank portion 11 of cutting blade 14 that cuts into the cutting object the n-th. Note than the cutting amount ap and the feed rate fz are set values set as cutting conditions.

In equation (1), setting rn-r(n−1) to Δrn and expanding equation (1), the cutting force Fn is represented by following equation (2).

[Equation 2]

$$Fn=K(ap\times fz+ap\times\Delta rn+hn\times fz+hn\times\Delta rn) \tag{2}$$

In equation (2), since the term hn×Δm is a negligibly small value, the cutting force Fn can be represented by the following equation (3).

[Equation 3]

$$Fn=(ap\times fz+ap\times\Delta rn+hn\times fz) \tag{3}$$

In equation (3), for example, the term ap×Δrn has a value about three times a value of the term hn×fz, and the term ap×fz has a value about ten times a value of the term ap×Δrn. Ap and fz are values determined in accordance with set values in the machining conditions. On the other hand, since hn and Δrn are values generated due to a deviation of the attachment position when cutting blade 14 is attached to blade fixing portion 13 or a lack of cutting blade 14, it is possible to more accurately detect a lack of cutting blade 14 by focusing on hn and Δrn.

Figure 17:
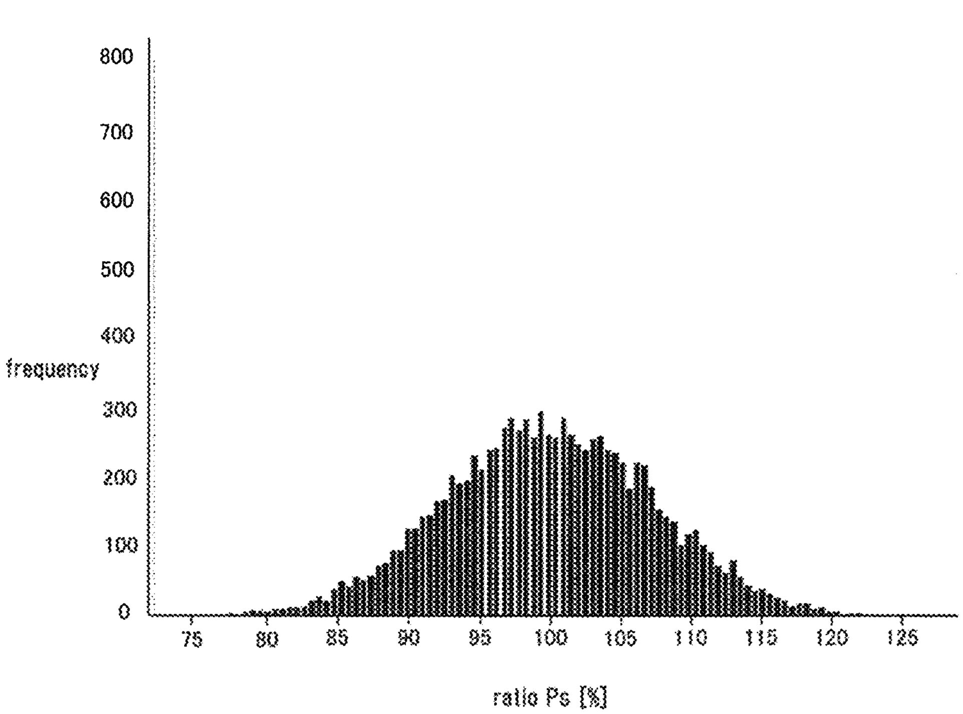
FIG. 17 is a frequency distribution showing a calculation result of a cutting force of a cutting blade in a cutting tool according to an embodiment of the present disclosure.
Figure 18:
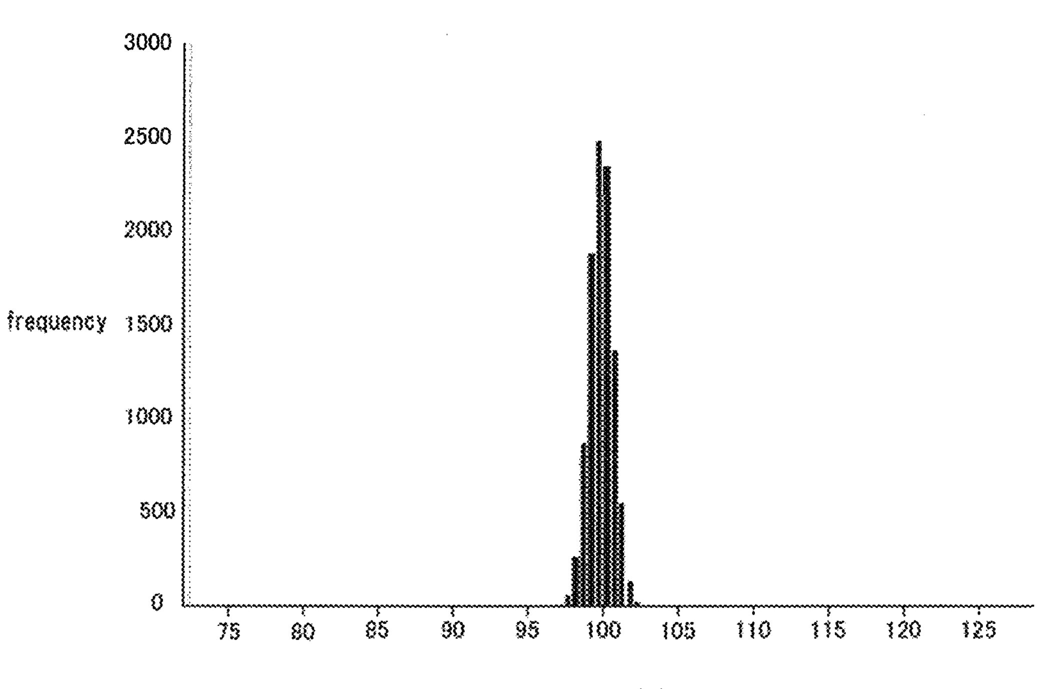
FIG. 18 is a frequency distribution showing a calculation result of a cutting force of a cutting blade in a cutting tool according to an embodiment of the present disclosure.

FIGS. 17 and 18 are frequency distributions showing calculation results of the cutting force of the cutting blade in the cutting tool according to the embodiment of the present disclosure. More specifically, FIGS. 17 and 18 show the frequency distribution obtained by numerically calculating the variation of the cutting force of cutting blade 14 in consideration of the deviation of the attachment position when cutting blade 14 is attached to blade fixing portion 13. In each of FIGS. 17 and 18, the horizontal axis represents the ratio P [%] of the cutting force F to the product apfz of the cutting amount ap and the feed rate fz, and the vertical axis represents the frequency. FIG. 17 shows the ratio Ps which is the ratio P of the cutting force F of one cutting blade 14 among four cutting blades 14 attached to cutting tool 101, and FIG. 18 shows the ratio Pm which is the ratio P of an average value Fmean of the cutting forces F of four cutting blades 14 attached to cutting tool 101.

Referring to FIG. 17, it is considered that the variation in the ratio Ps of the cutting force F of one cutting blade 14 is caused by the deviation of the attachment position when cutting blade 14 is attached to blade fixing portion 13. On the other hand, referring to FIG. 18, the ratio Pm of the average value Fmean of the cutting forces F of each cutting blade 14 has a smaller variation than the ratio Ps, and the ratio Pm can be regarded as 100%. That is, the average value Fmean can be assumed to be a value substantially equal to a value determined on the basis of the cutting amount ap and the feed rate fz which are set values set as the cutting conditions, and can be specifically represented by the following equation (4).

[Equation 4]

$$Fmean=K\times ap\times fz \tag{4}$$

From the equations (3) and (4), a difference DF between the cutting force Fn and the average value Fmean can be represented by the following equation (5).

[Equation 5]

$$DF=Fn-Fmean=K(ap\times\Delta rn+hn\times fz) \tag{5}$$

As shown in equation (5), difference DF is obtained by eliminating the term ap×fz from equation (3), and is represented only by terms including hn or Δrn. Therefore, by focusing on difference DF between the cutting force Fn and the average value Fmean, accurate detection processing can be performed.

Here, as described above, moving standard deviation ms is a value corresponding to the cutting force F received by each cutting blade 14 in cutting tool 101. On the other hand, average value Ams of moving standard deviations ms1 to ms4 is a value corresponding to the average value Fmean of the cutting forces F received by all cutting blades 14. Therefore, by calculating difference Dms between moving standard deviation ms and average value Ams and focusing on moving standard deviation MS of difference Dms, it is possible to more accurately detect a change in two-dimensional data D based on the occurrence of the abnormality of cutting blade 14, that is, a change in the cutting force F, and to perform more accurate detection processing.

Processing unit 130 is not limited to the configuration in which the abnormality of cutting blade 14 is detected based on moving standard deviation MS, and may be configured to detect the abnormality of cutting blade 14 using other methods such as an autoregressive model (AR model), an autoregressive moving average model (ARMA model), and Bayesian Online Changepoint Detection.

(Display Processing)

After performing the classification processing, processing unit 130 performs a display processing, which is a processing for displaying the classification result on display unit 150.

Figure 19:
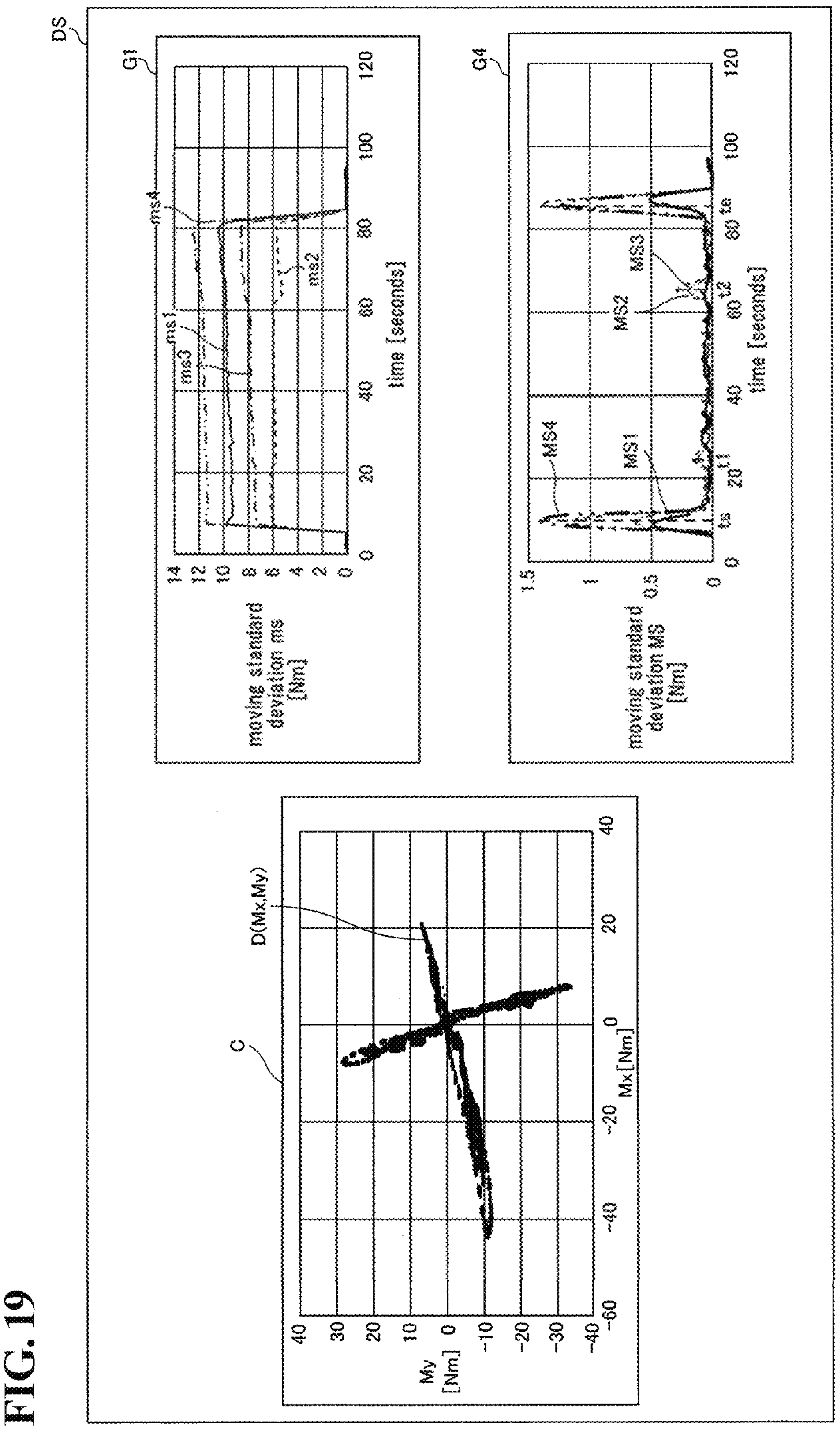
FIG. 19 is a diagram showing an example of a display screen displayed on a display unit in a processing apparatus according to an embodiment of the present disclosure.

FIG. 19 is a diagram showing an example of a display screen displayed on a display unit in a processing apparatus according to an embodiment of the present disclosure.

Referring to FIG. 19, for example, processing unit 130 performs a process of displaying a display screen DS including two-dimensional coordinate C in which the plot of two-dimensional data D and unit region A are illustrated as the classification result on display unit 150.

For example, processing unit 130 performs a process of displaying two-dimensional data D in a manner different for each unit region A. More specifically, for example, processing unit 130 performs a process of displaying display screen DS including two-dimensional coordinate C in which plots of different colors are illustrated for each unit region A on display unit 150. Alternatively, processing unit 130 performs a process of displaying display screen DS including two-dimensional coordinate C in which plots having different shapes are illustrated for each unit region A on display unit 150. Alternatively, processing unit 130 performs a process of displaying a display screen DS including two-dimensional coordinate C in which plots of different colors and shapes are illustrated for each unit region A on display unit 150.

In addition, for example, processing unit 130 performs a process of displaying a temporal change of two-dimensional data D for each unit region A. More specifically, processing unit 130 performs a process of displaying display screen DS including the graph G1 indicating the temporal change of moving standard deviation ms and the graph G4 indicating the temporal change of moving standard deviation MS together with two-dimensional coordinate C on display unit 150.

(Generation of Quadratic Function F1, F2)

Processing unit 130 generates quadratic functions F1 and F2 using the plurality of two-dimensional data D received from generation unit 120.

Figure 20:
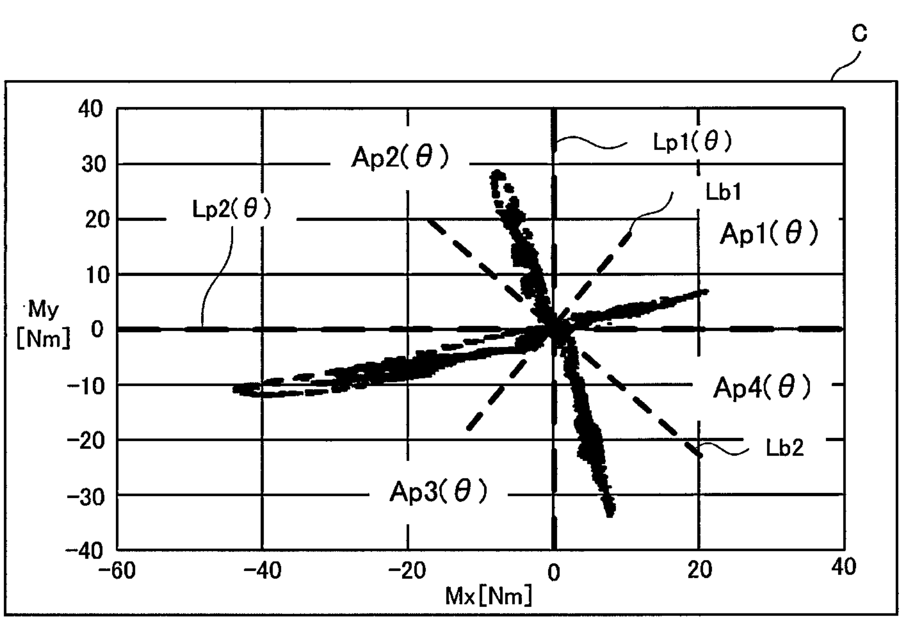
FIG. 20 is a diagram showing a method of determining a unit region by a processing unit in a processing apparatus according to an embodiment of the present disclosure.

FIG. 20 is a diagram showing a method of determining a unit region by a processing unit in a processing apparatus according to an embodiment of the present disclosure.

Referring to FIG. 20, for example, processing unit 130 first converts each two-dimensional data D into a polar coordinate system. Then, processing unit 130 classifies each two-dimensional data D into four provisional unit regions Ap1, Ap2, Ap3, and Ap4 in two-dimensional coordinate C by provisional boundary lines Lp1(θ) and Lp2(θ) which are two straight lines passing through the origin in two-dimensional coordinate C and orthogonal to each other.

Then, processing unit 130 calculates an angle sum Asum1(θ) which is a sum of angles formed by a bisector Lb1 of provisional boundary lines Lp1(θ) and Lp2(θ) defining provisional unit region Ap1 and each two-dimensional data D classified into provisional unit region Ap1. Similarly, processing unit 130 calculates an angle sum Asum2(θ) which is a sum of angles formed by a bisector Lb2 of provisional boundary lines Lp1(θ) and Lp2(θ) defining provisional unit region Ap2 and each two-dimensional data D classified into provisional unit region Ap2. In addition, processing unit 130 calculates an angle sum Asum3(θ) which is a sum of angles formed by bisector Lb1 of provisional boundary lines Lp1(θ) and Lp2(θ) defining provisional unit region Ap3 and each two-dimensional data D classified into provisional unit region Ap3. In addition, processing unit 130 calculates an angle sum Asum4(θ) which is a sum of angles formed by bisector Lb2 of provisional boundary lines Lp1(θ) and Lp2(θ) defining provisional unit region Ap4 and each two-dimensional data D classified into provisional unit region Ap4.

Processing unit 130 calculates a sum of angle sums Asum1(θ), Asum2(θ), Asum3(θ), and Asum4(θ) as an evaluation value V(θ).

Then, processing unit 130 shifts provisional boundary lines Lp1(θ) and Lp2(θ) by a small angle, for example, 1° around the origin, and calculates an evaluation value V(θ+1) in the above-described procedure using provisional boundary lines Lp1(θ+1) and Lp2(θ+1) obtained by shifting provisional boundary lines Lp1(θ) and Lp2(θ) by 1°. In this way, processing unit 130 repeatedly calculates an evaluated value V(θ+n) while shifting provisional boundary lines Lp1(θ) and Lp2(θ) by 1° until provisional boundary lines Lp1(θ) and Lp2(θ) are rotated by 360° around the origin. Here, n is an integer of 1 or more and 360 or less.

Processing unit 130 determines provisional boundary lines Lp1(θ+n) and Lp2(θ+n) as boundary lines L1 and L2 when evaluation value V(θ+n) is the minimum, generates quadratic function F1 indicating boundary line L1 and quadratic function F2 indicating boundary line L2, and stores generated quadratic functions F1 and F2 in storage unit 140.

Processing unit 130 may generate quadratic functions F1 and F2 before the start of the cutting process each time the cutting process is performed, or may generate quadratic functions F1 and F2 each time the positional relationship between cutting blade 14 and strain sensor 20 is changed due to replacements of cutting blade 14 or sensor 20.

[Flow of Operation]

Each apparatus in the cutting system according to the embodiment of the present disclosure is provided with a computer including a memory, and an arithmetic processing unit such as a CPU in the computer reads a program including a part or all of each step of the following flowcharts and sequences from the memory and executes the program. The programs of the plurality of apparatuses are distributed in a state of being stored in recording media such as an HDD (Hard Disk Drive), a CD-ROM (Compact Disc Read Only Memory), a DVD-ROM (Digital Versatile Disk Read Only Memory), and a semiconductor memory. The programs of the plurality of apparatuses can be installed from the outside. For example, the programs of the plurality of apparatuses can be installed from the recording medium described above. Further, for example, the programs of the plurality of apparatuses can be downloaded and installed from a predetermined server or the like via a network typified by an electric communication line, a wireless communication line, a wired communication line, and the Internet. Further, for example, the programs of the plurality of apparatuses can be downloaded and installed from a predetermined server or the like by data broadcasting or the like.

Figure 21:
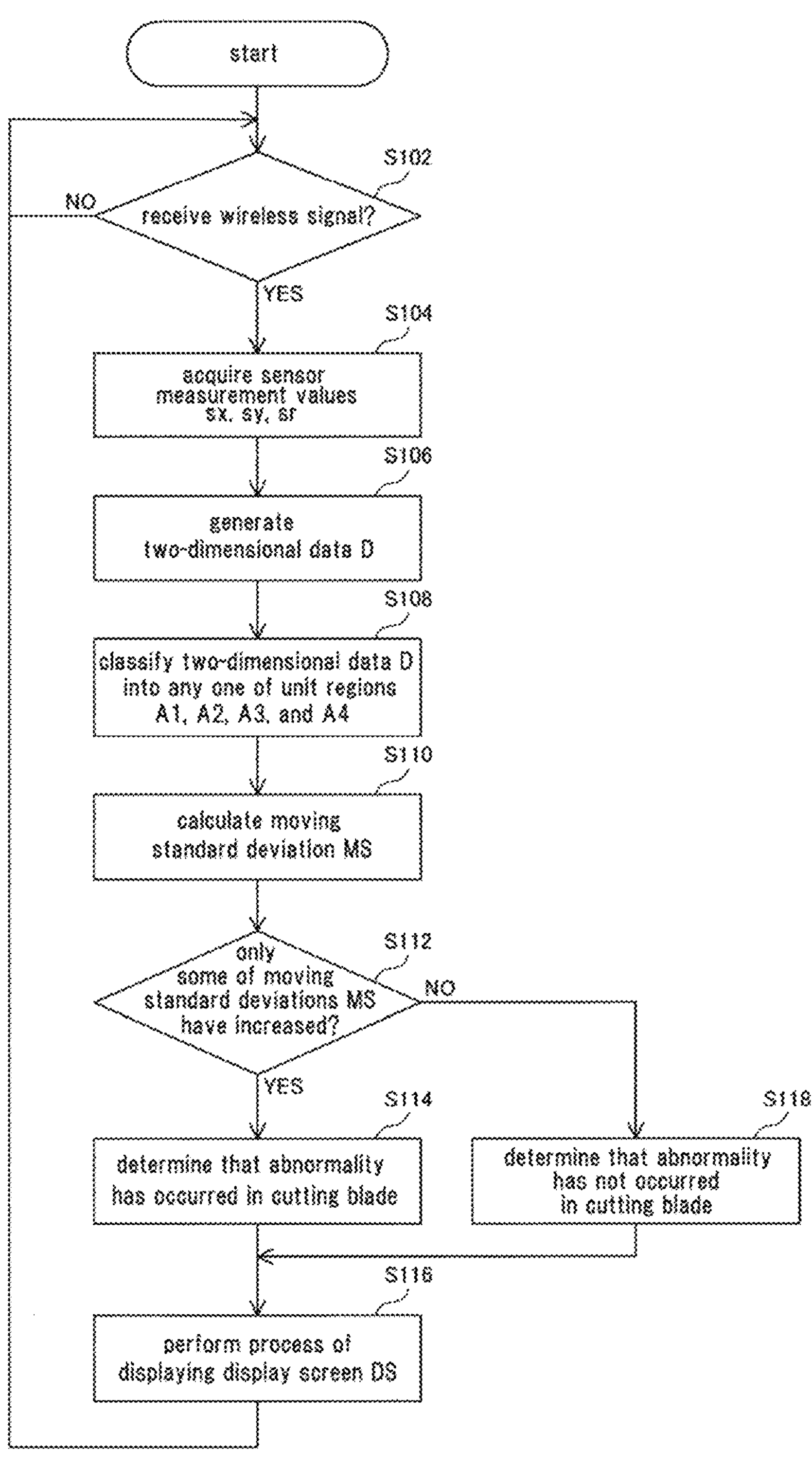
FIG. 21 is a flowchart defining an example of an operation procedure when a processing apparatus in a cutting system according to an embodiment of the present disclosure determines a state of a cutting blade.

FIG. 21 is a flowchart defining an example of an operation procedure when the processing apparatus in the cutting system according to the embodiment of the present disclosure determines a state of a cutting blade.

Referring to FIG. 21, first, processing apparatus 201 waits for a wireless signal from wireless communication apparatus 23 in cutting tool 101 (NO in step S102), and upon receiving the wireless signal (YES in step S102), acquires the sensor measurement values sx, sy, sr and the identification information from the received wireless signal (step S104).

Next, processing apparatus 201 generates two-dimensional data D indicating moments Mx and My based on the acquired sensor measurement values sx, sy, sr and the conversion matrix in storage unit 140 (step S106).

Next, processing apparatus 201 classifies generated two-dimensional data D into any one of unit regions A1, A2, A3, and A4 (step S108).

Next, processing apparatus 201 calculates moving standard deviation MS based on two-dimensional data D for each unit region A (step S110).

Next, when only some of moving standard deviations MS among the plurality of moving standard deviations MS corresponding to respective unit regions A have increased (YES in step S112), processing apparatus 201 determines that abnormality has occurred in cutting blade 14 (step S114).

Next, processing apparatus 201 performs a process of displaying display screen DS including two-dimensional coordinate C in which the plot of two-dimensional data D and unit regions A are illustrated, the graph G1 indicating the temporal change of moving standard deviation ms, and the graph G3 indicating the temporal change of moving standard deviation MS on display unit 150 (Step S116).

Next, processing apparatus 201 waits for a new wireless signal from wireless communication apparatus 23 in cutting tool 101 (NO in step S102).

On the other hand, when all moving standard deviations MS corresponding to respective unit regions A have not increased or when all moving standard deviations MS have increased (NO in step S112), processing apparatus 201 determines that abnormality has not occurred in cutting blade 14 (step S118).

Next, processing apparatus 201 performs a process of displaying display screen DS including two-dimensional coordinate C in which the plot of two-dimensional data D and unit regions A are illustrated, the graph G1 indicating the temporal change of moving standard deviation ms, and the graph G4 indicating the temporal change of moving standard deviation MS on display unit 150 (Step S116).

Next, processing apparatus 201 waits for a new wireless signal from wireless communication apparatus 23 in cutting tool 101 (NO in step S102).

Note that the order of step 116 and steps S112, S114, S118 is not limited to the above, and the order may be changed. In addition, any one of step S116 and steps S112, S114, S118 may not be performed.

Figure 22:
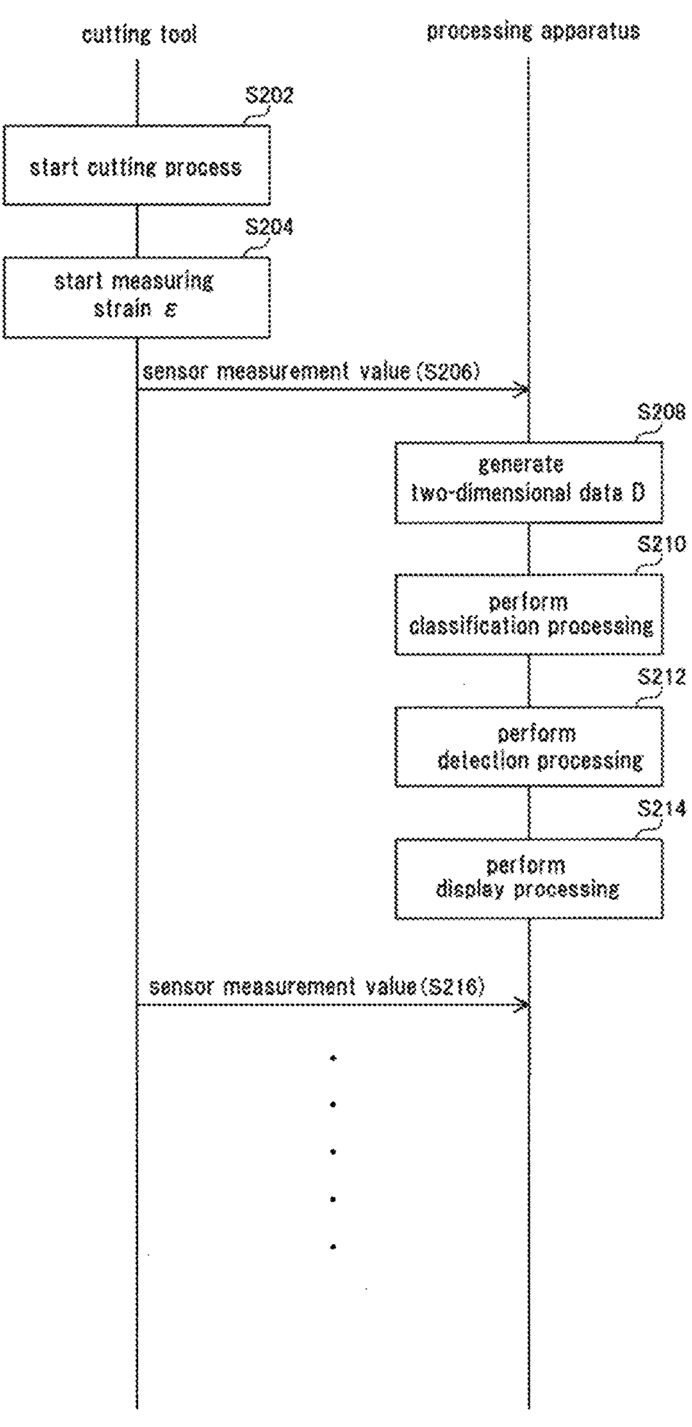
FIG. 22 is a diagram showing an example of a sequence of detection processing and display processing in a cutting system according to an embodiment of the present disclosure.

FIG. 22 is a diagram showing an example of a sequence of detection processing and display processing in the cutting system according to the embodiment of the present disclosure.

Referring to FIG. 22, first, cutting tool 101 starts a cutting process using two or more cutting blades (step S202).

Next, strain sensors 20 provided in cutting tool 101 start measuring strain ε of shank portion 11 (Step S204).

Next, cutting tool 101 includes sensor measurement values sx, sy, and sr based on the analog signals from strain sensors 20 in a wireless signal and transmits the wireless signal to processing apparatus 201 (step S206).

Next, processing apparatus 201 acquires the sensor measurement values sx, sy, sr from the wireless signal received from cutting tool 101, and generates two-dimensional data D indicating moments Mx and My based on the acquired sensor measurement values sx, sy, sr and the conversion matrix in storage unit 140 (step S208).

Next, processing apparatus 201 performs classification processing (step S210).

Next, processing apparatus 201 performs detection processing (step S212).

Next, processing apparatus 201 performs display processing (step S214).

Next, cutting tool 101 includes new sensor measurement values sx, sy, and sr based on the analog signals from strain sensors 20 in a wireless signal and transmits the wireless signal to processing apparatus 201 (step S216).

[Modification 1]

Although cutting tool 101 according to the embodiment of the present disclosure is an end mill including four blade fixing portions 13, it is not limited thereto. Cutting tool 101 may be configured to include two, three, five or more blade fixing portions 13. Further, cutting tool 101 may be a tool other than the end mill, such as a face milling cutter.

[Modification 2]

Although cutting system 301 according to the embodiment of the present disclosure has a configuration in which the number of strain sensors 20 is irrelevant to the number of cutting blades 14 in cutting tool 101, it is not limited thereto. Cutting system 301 may include a number of strain sensors 20 that has some correlation with the number of cutting blades 14.

In addition, cutting system 301 is configured to include a smaller number of strain sensors 20 than the number of cutting blades 14 in cutting tool 101, but it is not limited thereto. Cutting system 301 may be configured to include a number of strain sensors 20 equal to or greater than the number of cutting blades 14 in cutting tool 101.

[Modification 3]

In cutting system 301 according to the embodiment of the present disclosure, strain sensors 20 are provided on shank portion 11 of cutting tool 101, but it is not limited thereto. Strain sensor 20 may be provided in blade attaching portion 12 of cutting tool 101. Further, strain sensor 20 may be provided on tool holder 210, for example.

[Modification 4]

In cutting system 301 according to the embodiment of the present disclosure, strain sensor 20 is configured to measure strain ε of shank portion 11 in the direction parallel to rotation axis 17, but it is not limited thereto. Strain sensor 20 may be configured to measure the shear strain of shank portion 11.

In this case, for example, generation unit 120 generates two-dimensional data D indicating a load Fx in the X direction and a load Fy in the Y direction received by cutting tool 101 within cutting resistance acting surface 18, based on the sensor measurement value indicating the shear strain measured by strain sensor 20.

Further, cutting system 301 may be configured to include other sensors such as an acceleration sensor, a velocity sensor, and a displacement sensor instead of strain sensor 20 or in addition to strain sensor 20 as the plurality of sensors.

In this case, generation unit 120 generates two-dimensional data D indicating the acceleration in the X-direction and the acceleration in the Y-direction of cutting tool 101 in cutting resistance acting surface 18, two-dimensional data D indicating the velocity in the X-direction and the velocity in the Y-direction of cutting tool 101 in cutting resistance acting surface 18, or two-dimensional data D indicating the displacement in the X-direction and the displacement in the Y-direction of cutting tool 101 in cutting resistance acting surface 18 based on the measurement results by the sensor.

When the acceleration sensor or the velocity sensor is used, two-dimensional data D generated by generation unit 120 based on the measurement results and related to a cutting force F applied to one cutting blade 14 and two-dimensional data D related to a cutting force F applied to another cutting blade 14 point-symmetric to said cutting blade 14 with respect to rotation axis 17 appear at substantially the same position in two-dimensional coordinate C, and it may be difficult to classify two-dimensional data D for each cutting blade 14.

Therefore, when the acceleration sensor or the velocity sensor is used, it is preferable to use cutting tool 101 in which cutting blades 14 are not provided at point symmetrical positions related to rotation axis 17. Specifically, when the acceleration sensor or the velocity sensor is used, it is preferable to use, for example, cutting tool 101 including three blade fixing portions 13 at equal intervals around rotation axis 17 in blade attaching portion 12, or cutting tool 101 including five blade fixing portions 13 at equal intervals around rotation axis 17 in blade attaching portion 12.

[Modification 5]

In processing apparatus 201 according to the embodiment of the present disclosure, processing unit 130 is configured to classify the plurality of two-dimensional data D received from generation unit 120 into any one of the same number of unit regions A as the number of cutting blades 14 in the plane perpendicular to rotation axis 17, where the number is four, but it is not limited thereto. Processing unit 130 may be configured to classify the plurality of two-dimensional data D into any one of unit regions A whose number is larger than the number of cutting blades 14 in the plane perpendicular to rotation axis 17.

For example, processing unit 130 performs classification processing that is a process of classifying the plurality of two-dimensional data D into any one of twelve unit regions A in the plane perpendicular to rotation axis 17. In this case, unit region A is each region when 360 degrees is divided every 30 degrees. That is, unit region A is each region when the plane perpendicular to rotation axis 17 is equally divided into twelve regions around rotation axis 17 by six straight lines which are straight lines on the plane and pass through rotation axis 17.

[Modification 6]

In processing apparatus 201 according to the embodiment of the present disclosure, processing unit 130 is configured to detect the abnormality of cutting blade 14 based on the temporal change of the index value based on two-dimensional data D, but it is not limited thereto. Processing unit 130 may be configured to detect the abnormality of cutting blade 14 based on an absolute value of the index value based on two-dimensional data D.

[Modification 7]

In processing apparatus 201 according to the embodiment of the present disclosure, processing unit 130 is configured to calculate moving standard deviation ms in each unit region A, but it is not limited thereto. Processing unit 130 may be configured to calculate a moving maximum value in each unit region A as the index value for each unit region A, or may be configured to calculate a moving average ma in each unit region A.

For example, processing unit 130 calculates moving average ma of distance R from the origin of two-dimensional data D in each unit region A. To be more specific, processing unit 130 calculates a moving average ma1 of distances R1 of two-dimensional data D1, a moving average ma2 of distances R2 of two-dimensional data D2, a moving average ma3 of distances R3 of two-dimensional data D3, and a moving average ma4 of distances R4 of two-dimensional data D4.

Figure 23:
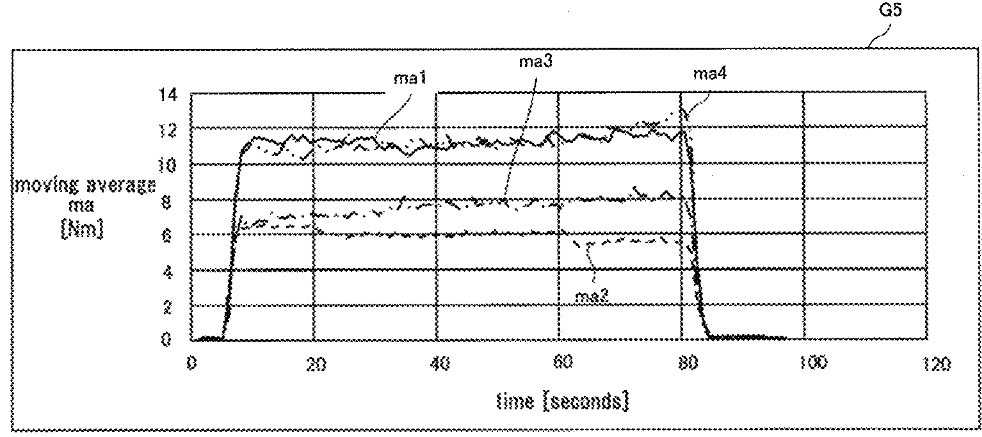
FIG. 23 is a diagram showing an example of a moving average ma calculated by a processing unit in a processing apparatus according to Modification 7 of an embodiment of the present disclosure.

FIG. 23 is a diagram showing an example of moving average ma calculated by the processing unit in the processing apparatus according to Modification 7 of the embodiment of the present disclosure. FIG. 23 shows a graph G5 in which the horizontal axis represents time [seconds] and the vertical axis represents moving average ma [Nm]. In FIG. 23, a solid line indicates moving average ma1, a broken line indicates moving average ma2, a one dot chain line indicates moving average ma3, and a two dot chain line indicates moving average ma4.

Referring to FIG. 23, processing unit 130 performs detection processing based on a temporal change of calculated moving average ma.

For example, processing unit 130 calculates a moving standard deviation MA of a difference Dma between moving average ma for each unit region A and an average value Ama of moving average ma of each unit region A.

More specifically, processing unit 130 calculates average value Ama of moving averages ma1 to ms4. Then, processing unit 130 calculates moving standard deviation MA of difference Dma between each moving average ma and average value Ama of moving averages ma. To be more specific, processing unit 130 calculates a moving standard deviation MA1 of a difference Dma1 between moving average ma1 and average value Ama, a moving standard deviation MA2 of a difference Dma2 between moving average ma2 and average value Ama, a moving standard deviation MA3 of a difference Dma3 between moving average ma3 and average value Ama, and a moving standard deviation MA4 of a difference DMa4 between moving average ma4 and average value Ama.

Figure 24:
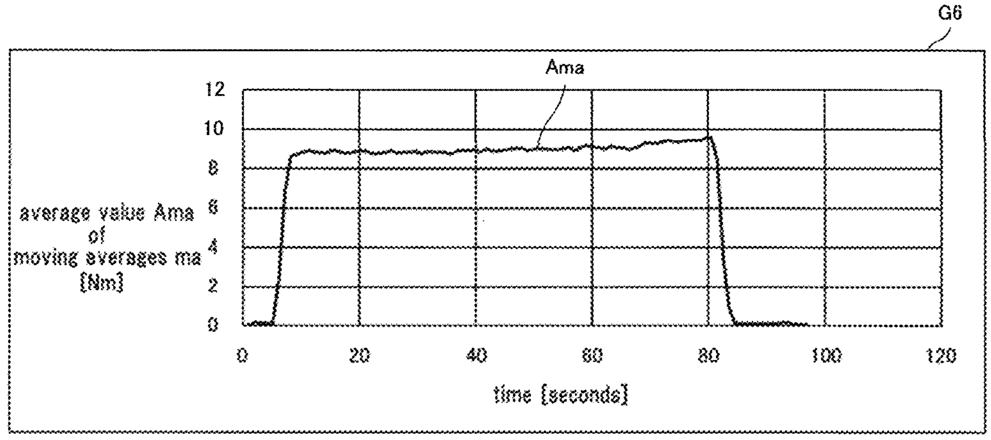
FIG. 24 is a diagram showing an example of an average value Ama calculated by a processing unit in a processing apparatus according to Modification 7 of an embodiment of the present disclosure.

FIG. 24 is a diagram showing an example of average value Ama calculated by the processing unit in the processing apparatus according to Modification 7 of the embodiment of the present disclosure. FIG. 24 shows a graph G6 in which the horizontal axis represents time (seconds) and the vertical axis represents average value Ama (Nm).

Figure 25:
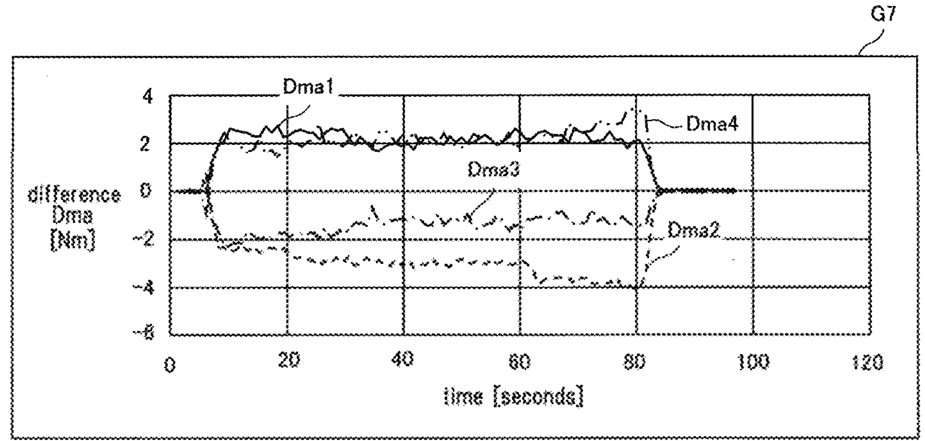
FIG. 25 is a diagram showing an example of a difference Dma calculated by a processing unit in a processing apparatus according to Modification 7 of an embodiment of the present disclosure.

FIG. 25 is a diagram showing an example of difference Dma calculated by the processing unit in the processing apparatus according to Modification 7 of the embodiment of the present disclosure. FIG. 25 shows a graph G7 in which the horizontal axis represents time (seconds) and the vertical axis represents difference Dma (Nm). In FIG. 25, a solid line indicates difference Dma1, a broken line indicates difference Dma2, a one dot chain line indicates difference Dma3, and a two dot chain line indicates difference Dma4.

Figure 26:
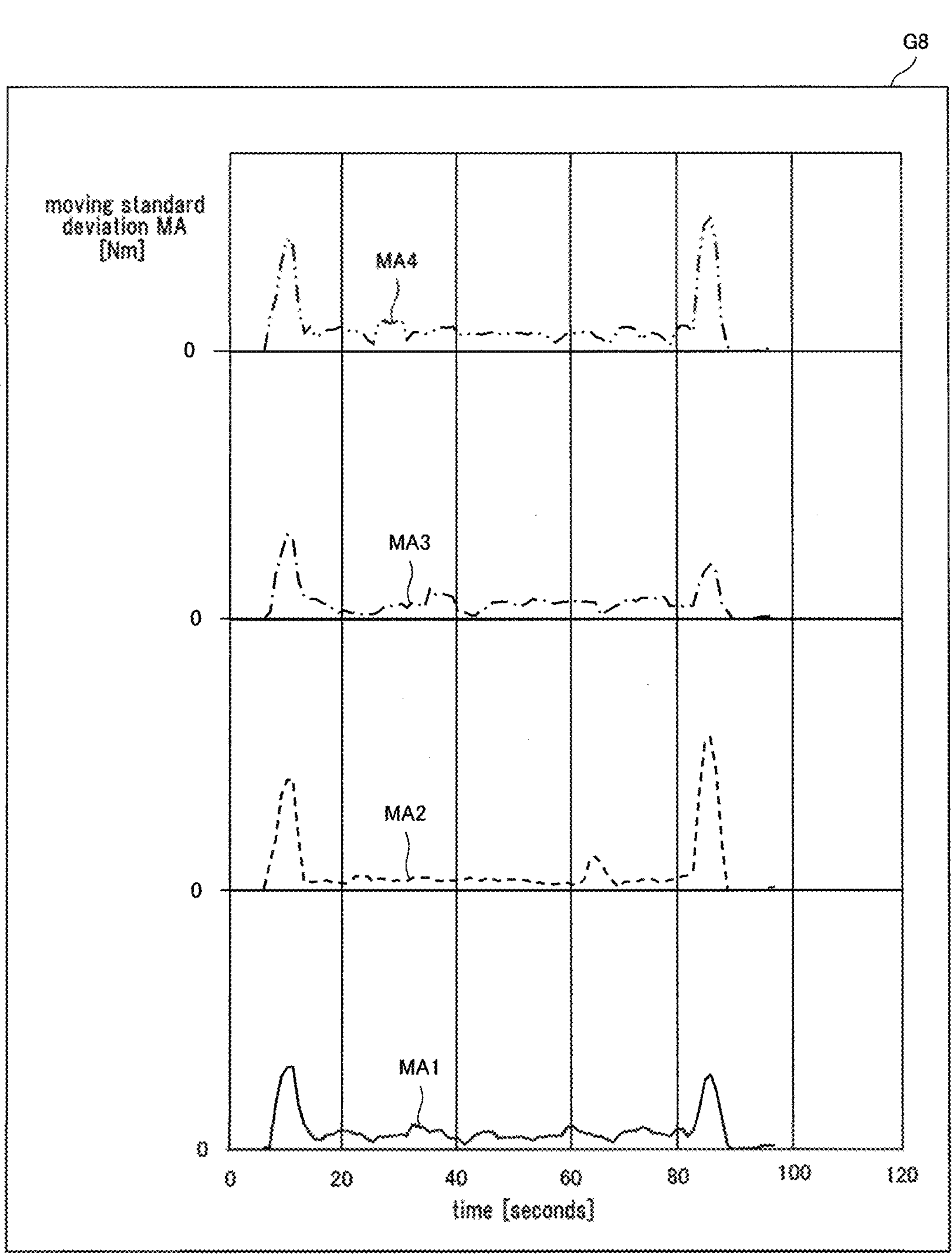
FIG. 26 is a diagram showing an example of a moving standard deviation MA calculated by a processing unit in a processing apparatus according to Modification 7 of an embodiment of the present disclosure.

FIG. 26 is a diagram showing an example of the moving standard deviation MA calculated by the processing unit in the processing apparatus according to Modification 7 of the embodiment of the present disclosure. FIG. 26 shows a graph G8 in which the horizontal axis represents time (seconds) and the vertical axis represents moving standard deviation MA (Nm). In FIG. 26, a solid line indicates moving standard deviation MA1, a broken line indicates moving standard deviation MA2, a one dot chain line indicates moving standard deviation MA3, and a two dot chain line indicates moving standard deviation MA4.

Referring to FIG. 26, for example, processing unit 130 detects the abnormality of cutting blade 14 based on calculated moving standard deviation MA. More specifically, processing unit 130 monitors a change of each moving standard deviation MA, and when all moving standard deviations MA are increased, determines that the increase is not caused by the abnormality of cutting blade 14, while determines that the abnormality occurs in cutting blade 14 when detecting that some of moving standard deviations MA are increased.

[Modification 8]

In cutting system 301 according to the embodiment of the present disclosure, processing unit 130 is configured to calculate moving standard deviation ms of distance R from the origin of two-dimensional data D in each unit region A after classifying two-dimensional data D received from generation unit 120, but it is not limited thereto. Processing unit 130 may be configured to calculate moving standard deviation ms using only distance R equal to or greater than a predetermined threshold value in each unit region A. That is, processing unit 130 may be configured to truncate two-dimensional data D. The two-dimensional data in which distance R is less than the predetermined value may be data before or after cutting blade 14 comes into contact with the cutting object, and thus more accurate detection processing can be performed by performing truncation of two-dimensional data D.

[Modification 9]

Although cutting system 301 according to the embodiment of the present disclosure is configured to include processing apparatus 201 separately from cutting tool 101, it is not limited thereto. Processing apparatus 201 may be provided in cutting tool 101, or may be provided in a machine tool. In addition, processing apparatus 201 is configured to perform detection processing and display processing, but it is not limited thereto. Processing apparatus 201 may be configured not to perform any one of detection processing and display processing.

Meanwhile, there is a demand for a technique capable of realizing excellent functions related to a cutting blade in a cutting tool.

For example, Patent Literature 1 describes that a strain sensor is attached to each cutting blade of a cutting tool, and abnormality of the corresponding cutting blade is detected based on a measurement value of each strain sensor. However, in the technique described in Patent Literature 1, when a cutting process in which a plurality of cutting blades come into contact with a cutting object is performed at a certain timing, the measurement value of each strain sensor becomes a value affected by a cutting force applied to a cutting blade other than the corresponding cutting blade, that is, a value affected by cutting forces applied to the plurality of cutting blades coming into contact with the cutting object. In other words, in the technique described in Patent Literature 1, a measurement value related to a cutting force applied to only one blade portion cannot be acquired from a corresponding strain sensor. Therefore, the abnormality of the cutting blade may not be accurately detected. In addition, in the technique described in Patent Literature 1, since the number of sensors corresponding to the number of cutting blades is required, the cost increases as the number of cutting blades increases.

Further, in the technique described in Patent Literature 2, when a sampling frequency at the time of AD conversion of measurement results by the sensor is not sufficient with respect to cutting conditions such as the number of cutting blades and the rotation speed of the cutting tool, a peak of a measurement value by the sensor may not be accurately detected, and abnormality of the cutting blade may not be accurately detected.

In addition, in the techniques described in Patent Literatures 8 and 9, a two dimensional projection view obtained from measurement results of the sensor becomes asymmetric due to an influence of a positional deviation in a rotation axis direction of each cutting blade and a radial direction of the shank, and abnormality of the cutting blade may not be accurately detected.

Further, in the technique described in Patent Literature 10, it is described that a sensor for measuring the driving force of the main shaft of the machine tool is used. However, in order to detect the abnormality of the cutting blade based on measurement results by such a sensor, it is necessary to perform analysis using a machining condition such as a rotation speed of the cutting tool, for example, and the configuration and the processing become complicated. Further, in the technique described in Patent Literature 10, since the process of classifying two-dimensional data D generated based on the measurement results by the sensor into unit region A is not performed, for example, the cutting force applied to the cutting blade cannot be analyzed for each cutting blade, and the abnormality of the cutting blade cannot be accurately detected in some cases.

In contrast, in cutting system 301 according to the embodiment of the present disclosure, cutting tool 101 performs the cutting process using two or more cutting blades 14. Strain sensor 20 measures a physical quantity indicating a state related to the load of cutting tool 101 at a time of the cutting process. Processing apparatus 201 generates, based on the measurement results obtained by strain sensor 20 at a plurality of measurement timings, two-dimensional data D for each measurement timing, where two-dimensional data D relate to the loads in two directions in a plane perpendicular to the rotation axis of cutting tool 101, classifies pieces of generated two-dimensional data D into any of a plurality of unit regions A, a number of which is greater than or equal to a number of cutting blades 14 on the plane, and detects, based on two-dimensional data D for each of unit regions A, the abnormality of cutting blade 14.

In processing apparatus 201 according to the embodiment of the present disclosure, wireless communication unit 110 acquires measurement results of strain sensor 20, that is, measurement results of a physical quantity indicating a state related to the load at a time of the cutting process in cutting tool 101 for milling performing the cutting process using two or more cutting blades. Generation unit 120 generates, based on the measurement results obtained by each of strain sensor 20 at a plurality of measurement timings acquired by wireless communication unit 110, two-dimensional data D for each of the measurement timings, where two-dimensional data D relate to the loads in two directions in a plane perpendicular to rotation axis 17 of cutting tool 101. Processing unit 130 classifies pieces of two-dimensional data D generated by generation unit 120 into any of a plurality of unit regions A, a number of which is greater than or equal to a number of cutting blades 14 on the plane, and detects, based on two-dimensional data D for each of the unit regions A, the abnormality of cutting blade 14.

The processing method according to the embodiment of the present disclosure is a processing method in processing apparatus 201. In this processing method, first, processing apparatus 201 acquires the measurement results of strain sensors 20, that is, the measurement results of the physical quantity indicating the state related to the load at a time of cutting process in cutting tool 101 for milling that performs the cutting process using two or more cutting blades 14. Next, processing apparatus 201 generates, based on the acquired measurement results obtained by each of strain sensors 20 at a plurality of measurement timings, two-dimensional data D for each of the measurement timings, where two-dimensional data D relate to the loads in two directions on a plane perpendicular to rotation axis 17 of cutting tool 101. Next, processing apparatus 201 classifies pieces of generated two-dimensional data D into any of a plurality of unit regions A, a number of which is greater than or equal to a number of cutting blades 14 on the plane, and detects, based on two-dimensional data D for each of unit regions A, the abnormality of cutting blades 14.

As described above, by the configuration and the method of classifying the pieces of two-dimensional data D generated based on the measurement results of strain sensors 20 into any one of the plurality of unit regions A in the plane perpendicular to rotation axis 17 and detecting the abnormality of cutting blade 14 based on two-dimensional data D of each unit region A, the change in two-dimensional data D in only some of the unit regions caused by the occurrence of the abnormality of the cutting blade can be detected separately from the change in two-dimensional data D in all the unit regions caused by the change in the cutting condition.

Therefore, in the cutting system, the processing apparatus, and the processing method according to the embodiments of the present disclosure, it is possible to realize excellent functions related to the cutting blade in the cutting tool.

In cutting system 301 according to the embodiment of the present disclosure, cutting tool 101 performs the cutting process using two or more cutting blades 14. Strain sensor 20 measures a physical quantity indicating the state related to the load of cutting tool 101 at a time of the cutting process. Processing apparatus 201 performs the process of generating, based on measurement results obtained by each of strain sensor 20 at a plurality of measurement timings, two-dimensional data D for each of the measurement timings, where two-dimensional data D are regarding the loads in two directions in a plane perpendicular to the rotation axis of cutting tool 101, classifying pieces of generated two-dimensional data D into any of a plurality of unit regions A, a number of which is greater than or equal to a number of cutting blades 14 on the plane, and displaying a classification result.

In processing apparatus 201 according to the embodiment of the present disclosure, wireless communication unit 110 acquires measurement results of strain sensors 20, that is, the measurement results of a physical quantity indicating the state related to the load at a time of the cutting process in cutting tool 101 for milling performing the cutting process using two or more cutting blades. Generation unit 120 generates based on the measurement results obtained by each of strain sensor 20 at a plurality of measurement timings acquired by wireless communication unit 110, two-dimensional data D for each of the measurement timings, where two-dimensional data D are regarding the loads in two directions on a plane perpendicular to rotation axis 17 of cutting tool 101. Processing unit 130 performs a process of classifying pieces of two-dimensional data D generated by generation unit 120 into any of a plurality of unit regions A, a number of which is greater than or equal to a number of cutting blades 14 on the plane, and displaying a classification result.

The processing method according to the embodiment of the present disclosure is a processing method in processing apparatus 201. In this processing method, first, processing apparatus 201 acquires measurement results of strain sensors 20, that is, the measurement results of a physical quantity indicating the state related to the load at a time of the cutting process in cutting tool 101 for milling performing the cutting process using two or more cutting blades 14. Next, processing apparatus 201 generates, based on the acquired measurement results obtained by each of strain sensors 20 at a plurality of measurement timings, two-dimensional data D for each of the measurement timings, where two-dimensional data D are regarding the loads in two directions on a plane perpendicular to rotation axis 17 of cutting tool 101. Next, processing apparatus 201 performs a process of classifying pieces of generated two-dimensional data D into any of a plurality of unit regions A, a number of which is greater than or equal to a number of cutting blades 14 on the plane and displaying a classification result.

As described above, by the configuration and the method in which each two-dimensional data D generated based on the measurement results of strain sensor 20 is classified into any one of the plurality of unit regions A in the plane perpendicular to rotation axis 17, and the classification result is displayed, for example, the state of each cutting blade can be displayed as two-dimensional data for each unit region A. Therefore, the state of each cutting blade 14 can be recognized by the user.

Therefore, by the display system, the processing apparatus, and the processing method according to the embodiments of the present disclosure, it is possible to realize excellent functions related to the cutting blade in the cutting tool.

The above-described embodiments are to be considered in all respects as illustrative and not restrictive. The scope of the present invention is defined not by the above description but by the claims, and is intended to include meanings equivalent to the claims and all modifications within the scope.

The foregoing description includes the following additional features.

[Supplementary Note 1]

A cutting system including:

a cutting tool for milling;

a plurality of sensors; and a processing unit, wherein the cutting tool performs a cutting process using two or more cutting blades, the plurality of sensors measure a physical quantity indicating a state regarding a load of the cutting tool at a time of the cutting process, the processing unit generates, based on measurement results obtained by each of the sensors at a plurality of measurement timings, two-dimensional data for each of the measurement timings, the two-dimensional data regarding the load in two directions on a plane perpendicular to a rotation axis of the cutting tool, classifies pieces of the generated two-dimensional data into any of a plurality of unit regions, a number of which is greater than or equal to a number of the cutting blades on the plane, and detects, based on the two-dimensional data for each of the unit regions, an abnormality of the cutting blades, the processing unit calculates an index value based on the two-dimensional data for the plurality of unit regions, calculates a standard deviation of a difference between the index value for each of the unit regions and an average of the index values for the unit regions, and detects, based on the calculated standard deviation, the abnormality of the cutting blades, the processing unit calculates an index value based on the two-dimensional data for the plurality of unit regions, calculates a standard deviation of a difference between the index value for each of the unit regions and a mean of the index values for the unit regions, and detects, based on the calculated standard deviation, the abnormality of the cutting blades, and the processing unit calculates a moving average or a moving standard deviation of a distance from an origin in the plane of the two-dimensional data in each of the unit regions as the index value.

[Supplementary Note 2]

A display system including:

a cutting tool for milling;

a plurality of sensors; and a processing apparatus, wherein the cutting tool performs a cutting process using two or more cutting blades, the plurality of sensors measure a physical quantity indicating a state regarding a load of the cutting tool at a time of the cutting process, the processing apparatus performs a process of generating, based on measurement results obtained by each of the sensors at a plurality of measurement timings, two-dimensional data for each of the measurement timings, the two-dimensional data regarding the load in two directions on a plane perpendicular to a rotation axis of the cutting tool, classifying pieces of the generated two-dimensional data into any of a plurality of unit regions, a number of which is greater than or equal to a number of the cutting blades on the plane, and displaying a classification result, the processing unit classifies the pieces of the two-dimensional data into any of the unit regions, the number of which is equal to the number of the cutting blades, and the processing apparatus performs a process of displaying, as the classification result, the two-dimensional data in a manner different for each of the unit regions.

REFERENCE SIGNS LIST

11 shank portion
12 blade attaching portion
13 blade fixing portion
17 rotation axis
18 cutting resistance acting surface
20 strain sensor
22 battery
23 wireless communication apparatus
24 housing
101 cutting tool
110 wireless communication unit
120 generation unit
130 processing unit
140 storage unit
150 display unit
201 processing apparatus
210 tool holder
220 main shaft
301 cutting system

The invention claimed is:

1. A cutting system comprising:

a cutting tool for performing a cutting process, the cutting tool including:

a shank having a blade attaching portion, the blade attaching portion including a plurality blade fixing portions;

a plurality of strain sensors attached to the shank, the plurality of strain sensors being for measuring strain of the shank;

a memory sequentially storing measurement results obtained by the plurality of sensors during the cutting process by the cutting tool; and processing circuitry detecting an abnormality of at least one of a plurality of cutting blades attached to each of the plurality of blade fixing portions by repeatedly executing a process including the following (a)-(d) by accessing the memory during the cutting process by the cutting tool, wherein the processing circuitry is configured to:

(a) generate, based on the measurement results obtained by each of the plurality of strain sensors at a plurality of measurement timings by accessing the memory, two-dimensional data for each of the measurement timings, the two-dimensional data regarding the load in multiple directions on a plane intersecting the rotation axis, (b) classify pieces of the generated two-dimensional data into any of a plurality of unit regions, a number of which is greater than or equal to a number of the plurality of cutting blades on the plane, (c) calculate an index value based on the two-dimensional data of each of the plurality of unit regions, including calculating a moving standard deviation of a distance from an origin of the two-dimensional data for each unit region, and (d) detect, based on the calculated the moving standard deviation for each unit region, an abnormality of at least one of the plurality of cutting blades, including:

determining that an increase in the moving standard deviation is not caused by the abnormality of at least one of the plurality of cutting blades when all the moving standard deviations are increased, determining that an increase in the moving standard deviation is caused by the abnormality of at least one of the plurality of cutting blades when not all the moving standard deviations are increased.

2. The cutting system according to claim 1, wherein the processing circuitry classifies the pieces of the two-dimensional data into any of the unit regions, the number of which is equal to the number of the plurality of cutting blades.

3. The cutting system according to claim 1, wherein the processing circuitry sequentially generates and classifies the two-dimensional data, and detects, based on the number of the unit regions, for which a temporal change of the two-dimensional data is greater than or equal to a predetermined value, the abnormality of the plurality of cutting blades.

4. The cutting system according to claim 1, wherein a number of the plurality of strain sensors is irrelevant to the number of the plurality of cutting blades in the cutting tool.

5. The cutting system according to claim 1, wherein a number of the plurality of strain sensors is less than the number of the plurality of cutting blades in the cutting tool.

6. The cutting system according to claim 1, wherein the plurality of blade fixing portions are provided at positions shifted by 90° in a clockwise direction in a circumferential direction of the blade attaching portion.

7. The cutting system according to claim 1, wherein each of the plurality of cutting blades is an indexable insert, and wherein each of the plurality of cutting blades is fixed to a respective one of the plurality of blade fixing portions by a screw.

8. The cutting system according to claim 1, further comprising:

a housing covering the plurality of strain sensors from below and from a side;

a battery disposed in the housing; and a wireless communication apparatus disposed in the housing, the wireless communication apparatus including a communication circuit.

9. The cutting system according to claim 8, wherein the battery is connected to the plurality of strain sensor and to the wireless communication apparatus.

10. The cutting system according to claim 8, wherein the wireless communication apparatus performs analog-to-digital (AD) conversion on an analog signal received from the plurality of strain sensors at a predetermined sampling period.

11. The cutting system according to claim 10, wherein the wireless communication apparatus adds a time stamp indicating a sampling timing to each of the generated sensor measurement values and stores the generated sensor measurement values in a storage unit, the storage unit being nonvolatile memory.

12. The cutting system according to claim 1, wherein the circuitry is further configured to:

display a first diagram including the moving standard deviation for each unit region on a vertical axis of the first diagram and time on a horizontal axis of the first diagram, and calculate an average value of the moving standard deviation, and display a second diagram including the average value of the moving standard deviations on a vertical axis of the second diagram and time on a horizontal axis of the second diagram.

13. The cutting system according to claim 12, wherein the circuitry is further configured to:

calculate a moving standard deviation difference between each moving standard deviation of each unit region and the average value of the moving standard deviations of each unit region, and display a third diagram including each moving standard deviation difference on a vertical axis of the third diagram and time on a horizontal axis of the third diagram.

* * * * *